(12) United States Patent
Yamashita et al.

(10) Patent No.: US 7,304,104 B2
(45) Date of Patent: *Dec. 4, 2007

(54) CEMENT ADMIXTURE, CEMENT COMPOSITION AND METHOD FOR LAYING WORK THE SAME, AND METHOD FOR PRODUCING CEMENT HARDENED PRODUCT

(75) Inventors: Akihiko Yamashita, Ibaraki (JP); Hiromichi Tanaka, Yokohama (JP); Toru Uno, Yokohama (JP); Yoshiyuki Onda, Tokyo (JP); Tsuyoshi Hirata, Kobe (JP)

(73) Assignee: Nippon Shokubai Co. Ltd., Osaka (JP)

( * ) Notice: Subject to any disclaimer, the term of this patent is extended or adjusted under 35 U.S.C. 154(b) by 353 days.

This patent is subject to a terminal disclaimer.

(21) Appl. No.: 10/791,729

(22) Filed: Mar. 4, 2004

(65) Prior Publication Data

US 2004/0198871 A1    Oct. 7, 2004

(30) Foreign Application Priority Data

| Mar. 5, 2003 | (JP) | ............................. 2003-058191 |
| Mar. 5, 2003 | (JP) | ............................. 2003-058369 |
| Mar. 27, 2003 | (JP) | ............................. 2003-087753 |

(51) Int. Cl.
C04B 24/26    (2006.01)
C08K 5/06    (2006.01)

(52) U.S. Cl. .................. 524/5; 24/4; 24/376; 24/377

(58) Field of Classification Search ............... 524/4–5, 524/376–377
See application file for complete search history.

(56) References Cited

U.S. PATENT DOCUMENTS

| 4,471,100 A | 9/1984 | Tsubakimoto et al. |
| 4,946,904 A | 8/1990 | Akimoto et al. |
| 5,223,036 A | 6/1993 | Koyata et al. |
| 5,362,323 A | 11/1994 | Koyata et al. |
| 5,661,206 A | 8/1997 | Tanaka et al. |
| 6,174,980 B1 | 1/2001 | Hirata et al. |
| 6,388,038 B1 | 5/2002 | Hirata et al. |
| 6,911,494 B2 * | 6/2005 | Yamashita et al. .......... 524/556 |
| 2003/0106464 A1 | 6/2003 | Yamashita et al. |

FOREIGN PATENT DOCUMENTS

| EP | 0 537 872 A1 | 4/1993 |
| EP | 1 179 517 A2 | 2/2002 |
| JM | 2001-048620 | 2/2001 |
| JP | SHO-57-118058 | 7/1982 |
| JP | SHO-63-285140 | 11/1988 |
| JP | HEI-05-043288 | 2/1993 |
| JP | HEI-05-213651 | 4/1993 |
| JP | HEI-05-306152 | 11/1993 |
| JP | HEI-05-345647 | 12/1993 |
| JP | HEI-07-053249 | 2/1995 |
| JP | 07-215746 | 8/1995 |
| JP | HEI-09-142905 | 6/1997 |
| JP | HEI-09-241055 | 9/1997 |
| JP | HEI-09-286651 | 11/1997 |
| JP | 2000-233957 | 8/2000 |
| JP | 2002-121055 | 4/2002 |
| JP | 2002-187756 | 7/2002 |
| JP | 2002-348160 | 12/2002 |
| JP | 2003-012358 | 1/2003 |
| JP | 2003-073157 | 3/2003 |
| JP | 2003-073158 | 3/2003 |
| JP | 2003-095722 | 4/2003 |
| JP | 2003-171156 | 6/2003 |
| JP | 2003-212622 | 7/2003 |
| JP | 2003-212623 | 7/2003 |
| JP | 2003-212624 | 7/2003 |
| WO | WO-00/048961 | 8/2000 |
| WO | WO-02/096823 A1 | 12/2002 |

* cited by examiner

*Primary Examiner*—Peter Szekely
(74) *Attorney, Agent, or Firm*—Connolly Bove Lodge and Hutz

(57) ABSTRACT

The cement admixture of the present invention can provide viscosity decreasing ability as well as a high dispersing ability and slump loss preventing ability even in a high water reducing ratio range. The above-mentioned cement admixture comprises three components of a copolymer (A) containing a constituent unit (I) derived from the unsaturated (poly)alkylene glycol ether monomer (a) and a constituent unit (II) derived from a maleic acid monomer (b), a specific unsaturated (poly)alkylene glycol ether monomer (a) and a non-polymerizable (poly)alkylene glycol (B) having no alkenyl group.

31 Claims, No Drawings

CEMENT ADMIXTURE, CEMENT COMPOSITION AND METHOD FOR LAYING WORK THE SAME, AND METHOD FOR PRODUCING CEMENT HARDENED PRODUCT

TECHNICAL FIELD

The present invention relates to cement admixture, cement composition and method for execution of the same, and method for producing cement hardened product.

BACKGROUND ART

A cement composition has been used widely for external wall materials of buildings and structural bodies of construction since it can provide a cement hardened product excellent in strength and durability. Examples of such a cement composition include a cement paste prepared by adding water to cement, a mortar prepared by admixing sand, which is a fine aggregate, therewith, and a concrete prepared by further admixing gravel, which is a coarse aggregate, therewith. In general, in order to improve the air entrainment and fluidity, cement admixtures are added. Recently, their importance tends to be highly regarded and technical innovations have been developed for them.

The functions of the cement admixtures are to assure sufficient dispersing ability for the cement composition even if water content is decreased, retain the fluidity and workability of the cement composition, and improve the durability and strength along with decrease of water as well as to give an excellent cement composition with stable dispersing ability with the lapse of time. In concrete industrial fields today, concrete provided with such functions has been desired. In order to satisfy such requirements, it becomes very important to decrease the unit water quantity and, also, to prevent the decrease of the fluidity.

Among various cement admixtures, especially polycarboxylic acid type cement dispersants are advantageous as compared with other cement dispersants such as naphthalene ones in terms of excellent dispersing property. With respect to such cement dispersants, Japanese Kokai Publication Sho-57-118058 and Hei-09-142905 disclose cement dispersants comprising copolymers prepared by using predetermined unsaturated polyalkylene glycol ether monomers and maleic acid monomers at predetermined ratios, and Japanese Kokai Publication Sho-63-285140 discloses cement dispersants mainly comprising copolymers of polyoxyalkylene-monoalkenylalkyl ethers and maleic anhydride.

With respect to cement admixtures essentially comprising polycarboxylic acid copolymers and other components, Japanese Kokai Publication Hei-05-213651 discloses cement additives comprising copolymers of methoxypolyethylene glycol allyl ether and maleic anhydride and nitrous acid salts, and Japanese Kokai Publications Hei-09-241055 and Hei-09-286651 disclose use of polycarboxylic acid type cement dispersants with setting accelerators and setting retarders in combination. In addition, Japanese Kokai Publications Hei-05-43288 and 2002-187756 disclose use of polycarboxylic acid type cement dispersants with sulfonic acid type dispersants in combination.

However, these techniques do not completely solve decrease of fluidity with the lapse of time, namely "slump loss", and there was a room for contrivance to improve the workability of a cement composition in undertaking construction by giving sufficient fluidity to the cement composition. Further, in a high water reducing ratio range required for high strength concrete, the fluidity of the concrete is deteriorated and, especially, the viscosity is increased under high share condition, so that the pump load becomes extremely high at the time of pump transportation and it becomes difficult to carry out pump transportation. Therefore, there was a room for contrivance in order to decrease the viscosity of the concrete composition, and improve the workability.

In particular, in the case of applying a cement composition under high temperature environments in summer or the like, it is desired to improve the workability and efficiently executing the cement composition by preventing decrease of fluidity of the cement composition and, simultaneously, sufficiently exhibit the functions of the cement hardened product. In the case of execution and hardening the cement composition at a low temperature environment, there was a room for contrivance to carry out cement composition applying and hardening work efficiently and obtain sufficient functions of the cement hardened product by providing high dispersing ability and slump loss preventing ability even in a high water reducing ratio range and, also, by giving the viscosity decreasing ability and shortening the hardening time and subsequently improving the workability.

On the other hand, with respect to polycarboxylic acid type cement dispersants, which are excellent in dispersing ability, since the addition amount necessary to obtain sufficient fluidity is low in a low water reducing ratio range, in the case the bland or the lot No. (manufacturing plants and manufacturing date) of cement is changed, the fluidity of the obtained concrete is changed even if the addition ratio of the dispersant to cement is same; therefore, there was a room for contrivance to obtain stable dispersing ability in terms of quality control. Further, with respect to mass concrete such as concrete for dams, from a viewpoint of prevention of cracking attributed to hydration heat and budget of the construction, the unit cement quantity is to be suppressed to 300 kg/m³ or less in some cases. In such a poor concrete, even if a polycarboxylic acid type cement dispersant excellent in the dispersing ability is used, water bleeding and separation of gravel tend to easily take place; therefore, there was a room for contrivance to improve the workability of the concrete composition.

Further, European Patent Publication No. 1179517 discloses cement dispersants comprising a copolymer, as an essential component, including constitutional unit derived from unsaturated (poly)alkylene glycol ether monomer and constitutional unit derived from (meth) acrylic acid (salt), and WO 02/096823 discloses cement admixtures comprising two polymers as essential constituents, namely a polymer (A1) comprising a constituent unit derived from an unsaturated (poly)alkylene glycol ether monomer and a constituent unit derived from an unsaturated monocarboxylic acid monomer, and a polymer (B1) containing an oxyalkylene group or polyoxyalkylene group and carboxyl group. These cement dispersants are capable of exhibiting high dispersing ability even in a slight amount of addition. However, together with the excellent dispersing ability and slump loss preventing ability even in a high water reducing ratio range, there was a room for contrivance to exhibit sufficient viscosity decreasing ability, and to improve the workability in executing cement composition.

BRIEF SUMMARY OF THE INVENTION

It is an object of the present invention, which has been made in view of the above-mentioned state of the art, to provide a cement admixture that gives viscosity decreasing ability as well as a high dispersing ability and slump loss preventing ability even in a high water reducing ratio range, and a cement composition in which the cement admixture is used.

In the course of investigations made by them in search of cement admixtures, the present inventors found that a mixture comprising three components of a particular copolymer (A) containing a (poly)oxyalkylene group and carboxylic group, which is obtained by polymerization a particular unsaturated (poly)alkylene glycol ether monomer (a) and a maleic acid monomer (b), the particular unsaturated (poly) alkylene glycol ether monomer (a), and a non-polymerizable (poly)alkylene glycol (B) having no alkenyl group is available as a cement admixture exhibiting viscosity decreasing ability as well as high dispersing ability and slump loss preventing ability particularly in the high water reducing ratio range, and they found that the above problems could successfully be solved.

And, in carrying out execution and hardening work of the cement composition under a specific temperature condition, the addition of the setting accelerator (C1) at predetermined amount to the copolymer (A) in the cement admixture gives a cement admixture which shortens the hardening time by the setting accelerator (C1), while providing cement dispersing ability or the like and keeping the fluidity of the cement composition stable, based on the synergic effects of three components; the copolymer (A), the monomer (a), the non-polymerizable (poly)alkylene glycol (B) having no alkenyl group. Thus, they found that, the combination of the setting accelerator (C1) with the three components; the copolymer (A), the monomer (a), the non-polymerizable (poly)alkylene glycol (B) having no alkenyl group can make it possible to sufficiently exhibit the functional effects of these four components, in hardening the cement composition under a specific temperature condition, whereas the no-keeping the fluidity of the cement composition because of decreasing of cement dispersing ability by the effect of the setting accelerator (C1) tend not to take place.

Moreover, in carrying out execution of a cement composition with the cement admixture comprising the above-mentioned three components, they found that the use of at least one compound (C2) selected from oxycarboxylic acid, its salt, saccharide, and sugar alcohol at predetermined amount in the copolymer (A) can make it possible to prevent the decrease of fluidity at high temperature as well as to maintain high cement dispersing ability.

Furthermore, they found that mixing the cement admixture comprising the above-mentioned three components with a sulfonic acid type dispersant (C3) containing a sulfonic acid group in the molecule provides a cement admixture giving high dispersion retaining ability even in high temperature environments and stable dispersing ability regardless of the lot Number of the cement, and further suppressing separation of materials such as water and gravel even if the case of poorly admixed concrete, and thus improving the workability.

Therefore, the present invention is a cement admixture comprising three components of a copolymer (A), an unsaturated (poly)alkylene glycol ether monomer (a) and a non-polymerizable (poly)alkylene glycol (B) having no alkenyl group at ratios of the unsaturated (poly)alkylene glycol ether monomer (a) to the copolymer (A) in a range of 1 to 100% by mass and the non-polymerizable (poly)alkylene glycol (B) having no alkenyl group to the copolymer (A) in a range of 1 to 50% by mass, wherein the copolymer (A) contains a constituent unit (I) derived from the unsaturated (poly)alkylene glycol ether monomer (a) and a constituent unit (II) derived from a maleic acid monomer (b) at ratios of the constituent unit (I) and the constituent unit (II) in a range of 1% by mass or more, respectively, in the entire constituent units, and the unsaturated (poly)alkylene glycol ether monomer (a) is represented by the general formula (1):

$$YO(R^1O)nR^2 \qquad (1)$$

(wherein Y represents an alkenyl group containing 2 to 4 carbon atoms, $R^2$ represents a hydrogen atom or a hydrocarbon group containing 1 to 30 carbon atoms, $R^1O$ represents one or more species of oxyalkylene groups containing 2 to 18 carbon atoms, and n represents the average molar number of addition of the oxyalkylene groups and is a number of 1 to 500).

The present invention is also a cement composition comprising said cement admixture, cement and water.

The present invention is also a method for producing a cement hardened product, comprising:

executing a cement composition comprising said cement admixture containing the setting accelerator (C1), cement and water; and hardening the cement composition at a temperature condition of 30° C. or less.

The present invention is also a method for execution of a cement composition comprising:

executing the cement composition comprising said cement admixture containing at least one compound (C2) selected from oxycarboxylic acid, its salt, saccharide, and sugar alcohol, cement and water at a temperature condition of 20° C. or more.

DETAILED DESCRIPTION OF THE INVENTION

In the following, the present invention is described in detail.

The cement admixture of the present invention comprises three components of a copolymer (A), an unsaturated (poly) alkylene glycol ether monomer (a) and a non-polymerizable (poly)alkylene glycol (B) having no alkenyl group, and these constituents each may comprise one single species or two or more species.

The above-mentioned copolymer (A) is the copolymer for cement admixture, and it can exhibit high cement dispersing ability in cement composition, and provide cement hardened product excellent in strength and durability. Such copolymer (A) contains a constituent unit (I) derived from the unsaturated (poly)alkylene glycol ether monomer (a) represented by the general formula (1):

$$YO\ (R^1O)nR^2 \qquad (1)$$

(wherein Y represents an alkenyl group containing 2 to 4 carbon atoms, $R^2$ represents a hydrogen atom or a hydrocarbon group containing 1 to 30 carbon atoms, $R^1O$ represents one or more species of oxyalkylene groups containing 2 to 18 carbon atoms, and n represents the average molar number of addition of the oxyalkylene group and is a number of 1 to 500), and a constituent unit (II) derived from a maleic acid monomer (b). These constituent units (I) and (II) each may comprise one or two or more species. The above copolymer (A) may further contain one or two or more species of following another or other copolymerizable monomer (c)-derived constituent unit (III). In addition, the constituent unit (I) is equivalent to the structure in which a polymerizable double bond of the monomer (a) represented by the general formula (1) is opened by polymerization reaction (namely, the structure in which the double bond (C=C) has become a single bond (—C—C—)). The constituent unit (II) is equivalent to the structure in which a polymerizable double bond of the maleic acid monomer (b) is opened by polymerization reaction. The constituent unit (III) is equivalent to the structure in which a polymerizable double bond of the above another copolymerizable monomer (c) is opened by polymerization reaction.

In the above-mentioned copolymer (A), the constituent unit (I) and (II), respectively, account for 1% by mass or more relative to the all constituent units. When the proportion of constituent unit (I) is less than 1% by mass, the content of the unsaturated (poly)alkylene glycol ether monomer (a)-derived oxyalkylene group in the copolymer (A) is too low and, when the proportion of constituent unit (II) is less than 1% by mass, the content of the maleic acid monomer (b)-derived carboxyl group in the copolymer (A) is too low, so that, in either case, no sufficient dispersing ability may be exhibited. The proportion of the constituent unit (I) is preferably not less than 5% by mass, more preferably not less than 10% by mass, still more preferably not less than 20% by mass, most preferably not less than 40% by mass. Further, the proportion of the constituent unit (I) is preferably not more than 50 mole % in the entire constituent units, since the polymerizability of the unsaturated (poly)alkylene glycol ether monomer (a) is low, therefore the copolymer (A) with high dispersing ability in high yields can obtained. On the other hand, the proportion of the constituent unit (II) is preferably not less than 2% by mass, more preferably not less than 3% by mass. The upper limit to the content of constituent unit (II) can be selected so that the number of milliequivalents of carboxyl groups contained in the copolymer (A) as determined on the unneutralized basis may be within the following preferable range. In addition, the total content (% by mass) of the constituent units (I) and (II) in the copolymer (A) is preferably 50 to 100% by mass, more preferably 70 to 100% by mass, relative to the whole copolymer (A).

In the above copolymer (A), it is preferred that the number of milliequivalents of carboxyl groups contained in each gram of copolymer (A) (meq/g) as determined on the unneutralized basis be 0.2 to 5.0. It is thus preferred that the proportion of each constituent unit constituting the copolymer (A) be selected so that the number of milliequivalents of carboxyl groups in the copolymer (A) amount to a value within the above range. When the number of milliequivalents of carboxyl groups (meq/g) is more than 5.0, the slump-retaining ability may tend to decrease, and when it is less than 0.2, the initial dispersing ability may tend to decrease. It is more preferably not less than 0.3, still more preferably not less than 0.4. On the other hand, it is more preferably not more than 4.5, still more preferably not more than 4.0, especially preferably not more than 3.5, most preferably not more than 3.0. The range of the above number of milliequivalents (meq/g) is more preferably 0.3 to 4.5, still more preferably 0.3 to 4.0, especially preferably 0.4 to 3.5, most preferably 0.4 to 3.0.

Since the copolymer (A) may contain another or other carboxyl group-containing constituent unit in addition to the carboxyl containing-constituent unit (II) derived from the maleic acid monomer (b), the above-mentioned number of milliequivalents of carboxyl groups is not limited to the case only where it is derived from the constituent unit (II). Further, in the copolymer (A), it is preferred that the number of milliequivalents of carboxyl groups originated in the constituent unit (II) is more than the one originated in the above another or other carboxyl-containing constituent unit.

The above term "number of milliequivalents of carboxyl groups contained in each gram of copolymer (A) (meq/g) as determined on the unneutralized basis" is used herein to include the case where the copolymer (A) is in a salt form. The methods of calculation are shown below for the case where it occurs as an acid and for the case where it occurs as a salt. While, in the following calculations, the constituent unit (II)-derived carboxyl groups alone are exemplified, if another carboxyl group-containing constituent unit is contained in the copolymer, this must be taken into consideration in calculating the number of milliequivalents of carboxyl groups.

CALCULATION EXAMPLE 1

When a copolymer with a monomer (a)/monomer (b) content ratio of 90/10 (% by mass) is obtained by using maleic acid as monomer (b), the number of milliequivalents of monomer (b)-derived carboxyl groups per gram of the above copolymer (meq/g) as determined on the unneutralized basis is $0.1/(0.9+0.1)/(116/2) \times 1000 = 1.72$, since the molecular weight of maleic acid is 116, maleic acid is divalent acid containing two carboxyl groups in a molecule.

CALCULATION EXAMPLE 2

When a copolymer with a monomer (a)/monomer (b) content ratio of 90/10 (% by mass) is obtained by using disodium maleate as monomer (b), the number of milliequivalents of monomer (b)-derived carboxyl groups per gram of the above copolymer (meq/g) as determined on the unneutralized basis is $(0.1 \times 116/160)/(0.9+0.1 \times 116/160)/(116/2) \times 1000 = 1.29$, since the molecular weight of disodium maleate is 160 and that of maleic acid is 116, maleic acid is divalent acid containing two carboxyl groups in a molecule. When maleic acid is used in carrying out polymerization and, after polymerization, the maleic acid-derived carboxylic groups are completely neutralized with sodium hydroxide, the same result as in this calculation example is obtained.

In addition to the monomer-based method of calculating the number of milliequivalents of carboxyl groups (meq/g), as mentioned above, the number can also be calculated by measuring the acid value of the above copolymer (A) while taking into consideration the counter ion species of the carboxyl groups in the copolymer (A).

In the above-mentioned unsaturated (poly)alkylene glycol ether monomer (a), the oxyalkylene group(s) represented by $R^1O$ in the general formula (1), as mentioned above, may be constituted of one or two or more oxyalkylene group species. The number of carbon atoms in the oxyalkylene group $R^1O$ is suitably 2 to 18 but preferably 2 to 8, more preferably 2 to 4. In the case of alkylene oxide adducts derived from two or more species optionally selected from among ethylene oxide, propylene oxide, butylene oxide, styrene oxide and the like, the mode of addition maybe of the random, block and/or alternating type, for instance. For securing a balance between the hydrophilicity and hydrophobicity, it is preferred that the oxyalkylene group comprises the oxyethylene group, with the oxyethylene group preferably accounting for at least 50 mole percent (mole %), more preferably at least 80 mole %, most preferably at least 90 mole %.

The average molar number n of addition of the oxyalkylene group represented by the above $R^1O$ is suitably a number of 1 to 500. When the average molar number n exceeds 500, sufficient copolymerizability may not be obtasined. When it decreases, the hydrophilicity of the copolymer obtained tends to decrease, hence sufficient dispersing ability may not be obtained. Preferably, it is not less than 2, more preferably not less than 5, still more preferably not less than 10, in particular not less than 15, most preferably not less than 20. Preferably, it is not more than 300. The preferred range of the average molar number n of addition is 2 to 500, more preferably 5 to 500, further preferably 10 to 500, still more preferably 15 to 500, in particular 20 to 500, most preferably 20 to 300. The average molar number of addition means the average value for the molar number of the organic group(s) in question forming each mole of monomer by addition.

In the above general formula (1), $R^2$ represents a hydrogen atom or a hydrocarbon group containing 1 to 30 carbon atoms. The hydrocarbon group containing 1 to 30 carbon atoms is preferably a hydrocarbon group having no polymerizable double bond, for example, an alkyl group (aliphatic alkyl group or alicyclic alkyl group) containing 1 to 30 carbon atoms; a benzene ring-containing aromatic group containing 6 to 30 carbon atoms such as a phenyl group, an alkylphenyl group, a phenylalkyl group, an (alkyl)phenyl-substituted phenyl group or a naphthyl group. In the above $R^2$, with the increase in the number of carbon atoms in the hydrocarbon group, the hydrophobicity increases and the dispersing ability may decrease. Therefore, the number of carbon atoms in $R^2$ when this is a hydrocarbon group is preferably 1 to 22, more preferably 1 to 18, still more preferably 1 to 12, in particular 1 to 4. The case where $R^2$ is a hydrogen atom is most preferred.

In the above general formula (1), the alkenyl group represented by Y is an alkenyl group containing 2 to 4 carbon atoms. Suitable as the above Y are vinyl group, allyl group, methallyl group and 3-butenyl group. Among them, an alkenyl group containing 3 to 4 carbon atoms is preferred, and more preferably is allyl group or methallyl group.

The unsaturated (poly)alkylene glycol ether monomer (a) represented by the above general formula (1) can be produced, for example, by causing 1 to 500 moles of one alkylene oxide to add to an unsaturated alcohol such as allyl alcohol or methallyl alcohol. Suited for use as the above monomer (a) are (poly)ethylene glycol allyl ether, (poly)ethylene glycol methallyl ether, (poly)ethylene(poly)propylene glycol allyl ether, (poly)ethylene(poly)propylene glycol methallyl ether, (poly)ethylene(poly)butylene glycol allyl ether and (poly)ethylene(poly)butylene glycol methallyl ether. In the practice of the present invention, one or more of these can be used as monomer(s) (a) for providing the constituent unit (I).

In the present invention, two or more monomers differing in the average molar number n of addition of the oxyalkylene group can be used in combination as the unsaturated (poly)alkylene glycol ether monomer (a). Suitable are combination of two monomers (a) differing in n by not less than 5 (preferably differing in n by not less than 10, more preferably by not less than 20) and combinations of three or more monomers (a) differing in n by not less than 5 (preferably differing in n by not less than 10, more preferably by not less than 20) from one another. As regards the ranges of n's to be combined, the combination of a monomer (a) whose average molar number n of addition is 1 to 10 and a monomer (a) whose n is 6 to 500 (with the difference in n being preferably not less than 10, still more preferably 20) and the combination of a monomer (a) whose average molar number n of addition is 1 to 40 and a monomer (a) whose n is 40 to 500 (with the difference n being preferably not less than 10, more preferably not less than 20) are appropriate. In addition, in the case two or more species of monomers with different average molar number n of addition are used in combination, it is preferable to use the monomer (a) with a larger average molar number n of addition at a higher ratio (a ratio by mass) than the monomer (a) with a smaller average molar number n of addition. Further, in the case two species of monomers with different average molar number n of addition are used in combination, the composition ratio of the monomer (a) is preferably adjusted so that the average value of the average molar number n of addition of whole monomer (a) is a range of 10 to 150. More preferred is a range of 15 to 120, still more preferably a range of 20 to 100.

The maleic acid monomer (b) in the present invention is preferably the monomer, which is represented by the general formula (2):

(wherein X represents $—OM_2$ or $-Z-(R^3O)_qR^4$, $M_1$ and $M_2$ may be the same or different and each represents a hydrogen atom, a monovalent metal, a divalent metal, an ammonium group or an organic ammonium group, -Z- represents —O— or —NH—, $R^3O$ represents one or more species of oxyalkylene groups containing 2 to 18 carbon atoms, $R^4$ represents a hydrogen atom, an alkyl group containing 1 to 30 carbon atoms, a phenyl group, an aminoalkyl group, an alkylphenyl group or a hydroxyalkyl group (the number of carbon atoms of the alkyl groups in the aminoalkyl group, the alkylphenyl group and the hydroxyalkyl group is 1 to 30), q represents the average molar number of addition of the oxyalkylene groups and is a number of 0 to 500, provided that the compound includes those having acid anhydride group (—CO—O—CO—) formed by bond of oxygen bonded to $M_1$ with carbon bonded to X, in which $M_1$ and X do not exit). In addition, the above-mentioned oxyalkylene group represented by $R^3O$ may be constituted of one or two or more oxyalkylene group species.

The above-mentioned maleic acid monomer (b) is not particularly limited, for example, maleic acid or derivative thereof, and the monomer (b) may be used singly or two or more may be used in combination. Suitable as such maleic acid derivative are maleic anhydride; half ester derived from maleic acid and alcohol containing 1 to 30 carbon atoms; half amide derived from maleic acid and amine containing 1 to 30 carbon atoms; half amide or half ester derived from maleic acid and amino alcohol containing 1 to 30 carbon atoms; half ester derived from maleic acid and the compound (J) which is an adduct of 1 to 500 moles of an alkylene oxide(s) containing 2 to 18 carbon atoms with alcohol containing 1 to 30 carbon atoms; half amide derived from maleic acid and a compound obtained by amination of hydroxyl group at one terminal in the above compound (J); half ester derived from maleic acid and glycol containing 2 to 18 carbon atoms or polyalkylene glycol, which is an adduct of 2 to 500 moles of an alkylene oxide(s) with such glycol; half amide derived from maleaminic acid and glycol containing 2 to 18 carbon atoms or polyalkylene glycol, which is an adduct of 2 to 500 moles of an alkylene oxide(s) with such glycol, and monovalent metal salt, divalent metal salt, ammonium salt, and organic ammonium salt thereof. Among them, the above-mentioned maleic acid monomer (b) comprises preferably at least one monomer selected from the group consisting of maleic acid, maleic acid salt, maleic anhydride and maleate. More preferably, it comprises essentially maleic acid or maleic acid salt. In addition, the organic ammonium is protonated organic amine, and suitable are alkanolammonium such as ethanolammonium, diethanolammonium and triethanolammonium; alkylammonium such as triethylammonium.

In the copolymer (A), another copolymerizable monomer (c) may be used in addition to the monomer constituent providing said essential constituent units, and such monomer (c) provides the constituent unit (III). The proportion of the constituent unit (III) derived from the above monomer (c) may be within the range that does not spoil the effect of the present invention, but preferably 0 to 50% by mass relative to all constituent units in the copolymer (A), still more preferably 0 to 30% by mass. The above-mentioned monomer (c) provides the constituent unit (III) is the monomer, which is copolymerizable with the monomer (a) and/or the monomer (b). Suitable as the monomer (c) are the following, may use one single specie or two or more species among the following.

Unsaturated monocarboxylic acid such as acrylic acid, methacrylic acid and crotonic acid, and monovalent metal salt, divalent metal salt, ammonium salt and organic ammonium salt of these; unsaturated dicarboxylic acid such as fumaric acid, itaconic acid and citraconic acid, and monovalent metal salt, divalent metal salt, ammonium salt and organic ammonium salt of these; half ester and diester derived from unsaturated dicarboxylic acid such as fumaric acid, itaconic acid and citraconic acid, and alcohol containing 1 to 30 carbon atoms; half amide and diamide derived from the above-mentioned unsaturated dicarboxylic acid and amine containing 1 to 30 carbon atoms; half ester and diester derived from the above-mentioned unsaturated dicarboxylic acid and alkyl (amino) (poly)alkylene glycol, which is an adduct of 1 to 500 moles of an alkylene oxide(s) containing 2 to 18 carbon atoms with the above-mentioned alcohol or amine; half ester and diester derived from the above-mentioned unsaturated dicarboxylic acid and glycol containing 2 to 18 carbon atom or polyalkylene glycol, which is an adduct of 2 to 500 moles of an alkylene oxide(s) with such glycol; ester derived from unsaturated monocarboxylic acid such as methyl (meth)acrylate, ethyl (meth) acrylate, propyl (meth)acrylate, glycidyl (meth)acrylate, methyl crotonate, ethyl crotonate and propyl crotonate, and alcohol containing 1 to 30 carbon atoms; ester derived from unsaturated monocarboxylic acid such as (meth)acrylic acid and alkoxy(poly)alkylene glycol, which is an adduct of 1 to 500 moles of an alkylene oxide(s) containing 2 to 18 carbon atoms with alcohol containing 1 to 30 carbon atoms; adduct of 1 to 500 moles of an alkylene oxide(s) containing 2 to 18 carbon atoms to unsaturated monocarboxylic acid such as (meth)acrylic acid, such as (poly)ethylene glycol mono (meth) acrylate, (poly)propylene glycol mono (meth) acrylate and (poly)butylene glycol mono(meth)acrylate. (Poly) alkylene glycol di(meth)acrylate such as triethylene glycol di(meth)acrylate, (poly)ethylene glycol di(meth)acrylate, polypropylene glycol di(meth)acrylate and (poly)ethylene glycol-(poly)propylene glycol di(meth)acrylate; multifunctional (meth)acrylate such as hexanediol di(meth)acrylate, trimethylolpropane tri(meth)acrylate and trimethylolpropane di(meth)acrylate; (poly)alkylene glycol dimaleate such as triethylene glycol dimaleate and polyethylene glycol dimaleate; unsaturated sulfonic acids and monovalent metal salt, divalent metal salt, ammonium salt and organic ammonium salt thereof for example vinylsulfonate, (meth)allylsulfonate, 2-(meth)acryloxyethylsulfonate, 3-(meth)acryloxypropylsulfonate, 3-(meth)acryloxy-2-hydroxypropylsulfonate, 3-(meth)acryloxy-2-hydroxypropyl sulfophenyl ether, 3-(meth)acryloxy-2-hydroxypropyloxysulfobenzoate, 4-(meth) acryloxybutylsufonate, (meth)acrylamidomethylsulfonate, (meth)acrylamidoethylsulfonate, 2-methylpropanesulfonic acid (meth) acrylamide, and styrenesulfonic acid; amide derived from unsaturated monocarboxylic acid and amine containing 1 to 30 carbon atoms, for example methyl(meth) acrylamide; vinyl aromatic such as styrene, á-methylstyrene, vinyltoluene and p-methylstyrene; alkanediol mono(meth) acrylate such as 1,4-butanediolmono(meth)acrylate, 1,5-pentanediol mono(meth)acrylate and 1,6-hexanediol mono (meth)acrylate; diene such as butadiene, isoprene, 2-methyl-1,3-butadiene and 2-chloro-1,3-butadiene.

Unsaturated amide such as (meth)acrylamide, (meth)acrylalkylamide, N-methylol(meth)acrylamide and N,N-dimethyl (meth) acrylamide; unsaturated cyano compound such as (meth)acrylonitrile and á-chloroacrylonitrile; unsaturated ester such as vinyl acetate and vinyl propionate; unsaturated amine such as aminoethyl (meth)acrylate, methylaminoethyl (meth)acrylate, dimethylaminoethyl (meth)acrylate, dimethylaminopropyl (meth)acrylate, dibutylaminoethyl (meth)acrylate and vinylpyridine; divinyl aromatic such as divinylbenzene; cyanurate such as triallyl cyanurate; allyl compounds such as (meth) allyl alcohol and glycidyl (meth) allyl ether; and siloxane derivative such as polydimethylsiloxanepropylaminomaleamidic acid, polydimethylsiloxaneaminopropyleneaminomaleamidic acid, polydimethylsiloxane-bis(propylaminomaleamidic acid), polydimethylsiloxane-bis(dipropyleneaminomaleamidic acid), polydimethylsiloxane-(1-propyl-3-acrylate), polydimethylsiloxane-(1-propyl-3-methacrylate), polydimethylsiloxane-bis(1-propyl-3-acrylate) and polydimethylsiloxane-bis(1-propyl-3-methacrylate).

Among them, as for the another copolymerizable monomer (c) providing the constituent unit (III), adduct of 1 to 500 moles of an alkylene oxide(s) containing 2 to 18 carbon atoms to unsaturated monocarboxylic acid such as 2-hydroxyethyl(meth)acrylate and 2-hydroxypropyl(meth) acrylate, ester derived from unsaturated monocarboxylic acid and alcohol containing 1 to 30 carbon atoms, or unsaturated monocarboxylic acid is especially preferably used.

In the present invention, a method for producing the copolymer (A) is not particularly limited and, for example, the copolymer can be produced by copolymerizing monomer components essentially comprising unsaturated (poly) alkylene glycol ether monomer (a) giving the constituent unit (I) and maleic acid monomer (b) giving the constituent unit (II). Further, for example, in place of the monomer (a), monomer before addition of alkylene oxide, that is, unsaturated alcohol such as (meth)allyl alcohol may be used. On that occasion, the copolymer (A) can be also produced by causing 1 to 500 moles, on average, of an alkylene oxide to add to a copolymer obtained by copolymerization, the monomer (b) and the above unsaturated alcohol in the presence of a polymerization initiator. At the time of copolymerization of the monomer components, if necessary, the above-mentioned other copolymerizable monomer (c) may further be copolymerized.

In the above-mentioned production method, the monomer components may be copolymerized using a polymerization initiator. In the present invention, the species and the amounts used of the monomers to be contained in the monomer components are appropriately set so as to give the constituent units composing the copolymer (A) as described above.

The above-mentioned copolymerization can be carried out in the manner of conventional polymerization such as solution polymerization or bulk polymerization. The solution polymerization can be carried out either batchwise or continuously. Suited for use as the solvent on that occasion are not particularly limited, for example, water; alcohol such as methyl alcohol, ethyl alcohol and isopropyl alcohol; aromatic or aliphatic hydrocarbon such as benzene, toluene, xylene, cyclohexane and n-hexane; ester compound such as ethyl acetate; ketone compound such as acetone and methyl ethyl ketone; cyclic ether compound such as tetrahydrofuran and dioxane. In view of the solubilities of the starting monomers and the polymer obtained, at least one solvent selected from the group consisting of water and lower alcohol containing 1 to 4 carbon atoms is preferably used. Among them, water is more preferably used as solvent, since the process of removing solvent can be omitted.

In carrying out an aqueous polymerization, use is made, as a radical polymerization initiator, a water-soluble polymerization initiator, for example, a persulfate salt such as ammonium persulfate, sodium persulfate or potassium persulfate; hydrogen peroxide; or a water-soluble azo initiator, for example an azoamidine compound such as 2,2'-azobis-2-methylpropionamidine hydrochloride, a cyclic azoamidine compound such as 2,2'-azobis-2-(2-imidazolin-2-yl)propane hydrochloride, or an azonitrile compound such as 2-carbamoylazoisobutyronitrile. On that occasion, an accelerator (reducing agent) may be used combinedly, for example an alkali metal sulfite such as sodium hydrogen sulfite, a metabisulfite, sodium hypophosphate, an Fe(II) salt such as Mohr's salt, sodium hydroxymethanesulfinate dihydrate, hydroxylamine hydrochloride, thiourea, L-ascorbic acid (salt) or erythorbic acid (salt). Among them, combination of hydrogen peroxide and organic reducing agent is preferred. Suited for use as the organic reducing agent are L-ascorbic acid (salt), L-ascorbate, erythorbic acid (salt) and erythorbate. The above radical polymerization initiator or accelerator (reducing agent) may be used singly or two or more of them may be used in combination, respectively.

In carrying out the solution polymerization using a lower alcohol, aromatic hydrocarbon, aliphatic hydrocarbon, ester compound or ketone compound as the solvent, or the bulk polymerization, a peroxide such as benzoyl peroxide or lauroyl peroxide; a hydroperoxide such as t-butyl hydroperoxide or cumene hydroperoxide; or an azo compound such as azobisisobutyronitrile, for instance, is used as the polymerization initiator. On that occasion, an accelerator such as an amine compound may be used in combination. Further, when a mixed solvent composed of water and a lower alcohol is used, an appropriate polymerization initiators or polymerization initiator-accelerator combination can be selected from among the above-mentioned various radical polymerization initiators or radical polymerization initiator accelerator combinations. The polymerization temperature may appropriately be selected depending on the solvent and polymerization initiator employed. Generally, the polymerization is carried out at 0 to 150° C.

With respect to the above-mentioned copolymerization, the amount of the entire monomer components to be used is preferably 30% by mass or more in the entire raw materials including other raw materials. When it is so lower than the amount, the polymerization ratio and the productivity possibly become insufficient. It is more preferably 40 to 99% by mass, further preferably 50 to 99% by mass, particularly preferably 55 to 95% by mass, and most preferably 60 to 90% by mass.

In the above-mentioned copolymerization, an injection method of each monomer to a reaction vessel is not particularly restricted but includes, for example, a method comprising injecting the whole monomers to a reaction vessel collectively at the initial stage; a method comprising injecting the whole monomers to a reaction vessel divisionally or continuously; and a method comprising injecting part of monomers to a reaction vessel at the initial stage and then injecting the remnant to a reaction vessel divisionally or continuously. Specifically, as preferred injection method, there may be mentioned the following methods (1) to (3).

(1) A method comprising injecting the whole monomer (a) and monomer (b) to a reaction vessel continuously.
(2) A method comprising injecting part of monomer (a) to a reaction vessel at the initial stage and then injecting the remnant of monomer (a) and whole monomer (b) to a reaction vessel continuously.
(3) A method comprising injecting part of monomer (a) and part of monomer (b) to a reaction vessel at the initial stage, and then injecting the remnant of monomer (a) and the remnant of monomer (b) to a reaction vessel in several portions, respectively by turns.

Further, by varying the injection speed of each monomer to a reaction vessel continuously or gradationally and changing the mass ratio of each injected monomer per time continuously or gradationally, a copolymer mixture containing constituent unit (I) and (II) differing in the content in the copolymer (A) may be synthesized in the polymerization reaction system. In addition, a radical polymerization initiator may be placed in a reaction vessel at the initial stage, or may be added dropwise to a reaction vessel, and these methods may be used combinedly according to need.

In the above-mentioned copolymerization, for controlling the molecular weight of the product copolymer (A) a chain transfer agent may be used. Suitable as the chain transfer agent are conventional hydrophilic chain transfer agent, for example, thiol chain transfer agent such as mercaptoethanol, thioglycerol, thioglycolic acid, 3-mercaptopropionic acid, thiomalic acid and 2-mercaptoethane sulfonic acid; secondary alcohol such as isopropyl alcohol; lower oxide such as phosphorous acid, hypophosphorous acid and salt thereof (for example, sodium hypophosphorate and potassium hypophosphorate), sulfurous acid, hydrogen sulfite, (meth)bisulfurous acid and salt thereof(for example, sodium sulfite, sodium hydrogen sulfite, sodium dithionite and sodium (meth)bisulfite), and salt thereof. Further, the use of hydrophobic chain transfer agent is effective for improvement in cement composition viscosity. Suitable as the hydrophobic chain transfer agent are thiol chain transfer agent having a hydrocarbon group containing 3 or more carbon atoms such as butanethiol, octanethiol, decanethiol, dodecanethiol, hexadecanethiol, octadecanethiol, cyclohexyl mercaptan, thiophenol, thioglycolic octyl, and 3-mercaptopropionic octyl. It is also possible to use two or more chain transfer agents combinedly and to use a hydrophilic chain transfer agent and hydrophobic chain transfer agent combinedly. Further, the molecular weight of the copolymer (A) can also be controlled effectively by using, as a monomer (d) described after, a monomer highly active in chain transfer, for example (meth)allylsulfonic acid (or a salt thereof).

For obtaining the copolymer (A) with a predetermined molecular weight with good reproducibility in the above polymerization, it is necessary that the polymerization reaction proceed in a stable manner. Therefore, in the case of solution polymerization, the dissolved oxygen concentration in the solvent employed at 25° C. is preferably not more than 5 ppm, more preferably 0.01 to 4 ppm, still more preferably 0.01 to 2 ppm, most preferably 0.01 to 1 ppm. When the addition of the monomers to the solvent is followed by purging with nitrogen or the like, it is preferable that the dissolved oxygen concentration in the system, including the monomers, be within the above range.

The adjustment of the dissolved oxygen concentration in the above solvent may be carried out in the polymerization vessel or by using the solvent adjusted in advance with respect to the dissolved oxygen content. Suitable as the method of eliminating oxygen in solvents are the following methods (1) to (5):

(1) A closed vessel containing the solvent is charged with an inert gas such as nitrogen, under pressure, and the pressure within the closed vessel is then reduced to thereby reduce the partial pressure of oxygen in the solvent. The pressure within the closed vessel may be reduced in a nitrogen stream.
(2) The gaseous phase in a vessel containing the solvent is replaced with an inert gas such as nitrogen, and the liquid phase is stirred vigorously for a sufficiently long period of time.
(3) The solvent placed in a vessel is bubbled with an inert gas such as nitrogen, for a sufficiently long period of time.
(4) The solvent is once boiled and then cooled in an inert gas (e.g. nitrogen) atmosphere.
(5) The relevant piping is provided with a static mixer, and the solvent is admixed with an inert gas such as nitrogen, in the course of transfer to the polymerization vessel through the piping.

The copolymer (A) prepared by the above-mentioned copolymerization may be used as it is as an essential component of the cement admixture of the present invention. However, it is preferable to adjust its pH in a range of a weakly acidic range in state of an aqueous solution in terms of handling convenience. The range of pH is more preferably 4 or more, further preferably 5 or more, particularly preferably 6 or more. On the other hand, the copolymerization reaction may be carried out at pH 7 or more. In such a case, the polymerization ratio is decreased and, also, the dispersing ability is deteriorated because of insufficient copolymerization; therefore, the copolymerization reaction is preferably carried out at a pH in a range from acidic to neutral condition. The pH is more preferably in a range of less than 6, further preferably less than 5.5, and particularly preferably less than 5. Accordingly, it is preferable to adjust pH to be higher by adding an alkaline substance after the copolymerization reaction is carried out at a low pH. As a preferable embodiment, practically, the following methods can be exemplified: after the copolymerization reaction is carried out at pH less than 6, the pH is adjusted to be 6 or more by adding an alkaline substance; after the copolymerization reaction is carried out at pH less than 5, the pH is adjusted to be 5 or more by adding an alkaline substance; and after the copolymerization reaction is carried out at pH less than 5, the pH is adjusted to be 6 or more by adding an alkaline substance. The pH adjustment may be carried out by using, for example, inorganic salt such as hydroxide and carbonate of monovalent metal or divalent metal; ammonia; alkaline substance such as organic amine and the like. Further, in the case pH has to be decreased, particularly in the case pH adjustment is required at the time of polymerization, for example, pH can be adjusted by using an acidic substance such as phosphoric acid, sulfuric acid, nitric acid, alkyl phosphate, alkyl sulfate, alkyl sulfonic acid, (alkyl) benzenesulfonic acid and the like. Among these acidic substances, phosphoric acid is preferable since it has a pH buffering function. In addition, on completion of the reaction, the concentration adjustment may be carried out if necessary. Further, the above-mentioned copolymer (A) may be used as an essential component of the cement admixture of the present invention as it is in form of an aqueous solution and, also, the copolymer (A) may be used in form of a powder prepared by converting it into a polyvalent metal salt by neutralization with a hydroxide of a divalent metal such as calcium or magnesium and then drying the metal salt; drying it by deposition on an inorganic powder such as a silica fine powder; or drying and fixing it in a thin film-like state on a support by using a drum type drying apparatus, a disk type drying apparatus or a belt type drying apparatus and then crushing the resulting dried product.

The weight-average molecular weight of the above copolymer (A) is preferably not less than 1000 as determined by gel permeation chromatography (hereinafter referred to as "GPC") on the polyethylene glycol equivalent basis. More preferably, the molecular weight is not less than 5000, still more preferably not less than 10000. On the other hand, the molecular weight is preferably not more than 500000. More preferably, the molecular weight is not more than 300000, still more preferably not more than 150000. The range of the molecular weight is preferably 1000 to 500000, more preferably 5000 to 300000, still more preferably 10000 to 150000. By using copolymer (A) having such a weight-average molecular weight range, it becomes possible to obtain cement admixture capable of manifesting higher level of dispersing ability.

In the cement admixture of the present invention, two or more species of the copolymers (A) may be used in combination and three or more species and four or more species of the copolymers (A) may also be used preferably in combination. As the combinations of two or more species of copolymers (A), for example, the following combinations are possible: combinations of two or more species of copolymers (A) with different ratios (mass ratios or mole ratios) of the constituent unit (I) derived from an unsaturated (poly)alkylene glycol ether monomer (a) and the constituent unit (II) derived from maleic acid monomer (b); and combinations of two or more species of copolymers (A) with different average molar number n of addition of oxyalkylene group of the unsaturated (poly)alkylene glycol ether monomer (a) represented by the above-mentioned general formula (1) in the respective copolymers.

In the cement admixture of the present invention, the content of the unsaturated (poly)alkylene glycol ether monomer (a) represented by the above-mentioned general formula (1) is properly 1 to 100% by mass in 100% by mass of the copolymer (A). When it is less than 1% by mass, the slump loss preventing ability and the viscosity decreasing ability cannot be sufficient. When it exceeds 100% by mass, the dispersing ability for cement may be deteriorated. It is preferably 2 to 100% by mass, more preferably 3 to 90% by mass, and further preferably 5 to 80% by mass. As the unsaturated (poly)alkylene glycol ether monomer (a), those same as or different from the unsaturated (poly)alkylene glycol ether monomer (a) used for polymerization of the copolymer (A), that is, the unsaturated (poly)alkylene glycol ether monomer (a) from which the constituent unit (I) of the copolymer (A) is derived, may be used. Further, two or more species of unsaturated (poly)alkylene glycol monomers (a) may be used.

In the present invention, the content of a non-polymerizable (poly)alkylene glycol (B) having no alkenyl group is suitably 1 to 50% by mass relative to 100% by mass of the copolymer (A). When it is less than 1% by mass, no sufficient viscosity decreasing ability may be obtained. When it exceeds 50% by mass, the dispersing ability forcement may be deteriorated. The content is preferably 2 to 50% by mass, more preferably 2 to 40% by mass, still more preferably 3 to 30% by mass.

The oxyalkylene group composing the non-polymerizable (poly)alkylene glycol (B) having no alkenyl group is preferably one or more species of oxyalkylene groups containing 2 to 18 carbon atoms, and the terminal group of the non-polymerizable (poly)alkylene glycol (B) having no alkenyl group is a hydrogen atom, an alkyl group or an (alkyl)phenyl group containing 1 to 30 carbon atoms. In addition, the oxyalkylene group may be constituted of one or two or more oxyalkylene group species.

The number of carbon atoms in the above oxyalkylene group is more preferably 2 to 8, still more preferably 2 to 4. Further, the non-polymerizable (poly)alkylene glycol (B) having no alkenyl group is preferably water soluble, and it is preferred that the oxyalkylene group comprises the oxyalkylene group containing 2 carbon atom, which is higher hydrophilic, namely oxyethylene group. More preferably, with the oxyethylene group accounting for at least 50 mole percent, still more preferably at least 90 mole percent. The repeating unit of the above-mentioned oxyalkylene group may be the same or different. When the oxyalkylene group is constituted of two or more oxyalkylene group species, the two or more oxyalkylene group species may be in any of the addition modes including the random, block, alternating, and other addition modes.

Further, the number of carbon atoms in the terminal group when this is a hydrocarbon group is preferably 1 to 22, more preferably 1 to 18, still more preferably 1 to 12, in particular 1 to 4. The case where the terminal group is a hydrogen atom is most preferred. The non-polymerizable (poly)alkylene glycol (B) having no alkenyl group, which is containing hydrogen atoms at both terminals is, for example, (poly)ethylene glycol, (poly)propylene glycol, (poly)ethylene (poly)propylene glycol and (poly)ethylene(poly)butylene glycol. Preferably, such non-polymerizable (poly)alkylene glycol (B) having no alkenyl group is (poly)alkylene glycol comprising oxyethylene group, which is higher hydrophilic, since the non-polymerizable (poly)alkylene glycol (B) having no alkenyl group is preferably water soluble. More preferably, with the oxyethylene group accounting for at least 50 mole percent, still more preferably at least 90 mole percent. Among them, (poly)ethylene glycol or (poly)ethylene (poly)propylene glycol is preferred, in particular (poly)ethylene glycol. In addition, the non-polymerizable (poly)alkylene glycol (B) having no alkenyl group may be used singly or two or more of them may be used in combination.

The weight-average molecular weight of the above non-polymerizable (poly)alkylene glycol (B) having no alkenyl group is preferably not less than 100 as determined be GPC on the polyethylene glycol equivalent basis. More preferably, the molecular weight is not less than 500, still more preferably not less than 1000. On the other hand, the molecular weight is preferably not more than 200000. More preferably, the molecular weight is not more than 100000, still more preferably not more than 50000. The range of the molecular weight is preferably 100 to 200000, more preferably 500 to 100000, still more preferably 1000 to 50000.

In the method for producing the cement admixture of the present invention, the above-mentioned non-polymerizable (poly)alkylene glycol (B) having no alkenyl group may be added after the production of the above-mentioned copolymer (A), however at the time of producing the copolymer (A), copolymerization of a composition, as a raw material, containing the non-polymerizable (poly)alkylene glycol (B) having no alkenyl group in addition to the monomer constituents containing the above-mentioned unsaturated (poly)alkylene glycol ether monomer (a) and the above-mentioned maleic acid monomer (b) as essential constituents may be carried out. Accordingly, the cement admixture comprising the copolymer (A) and the non-polymerizable (poly)alkylene glycol (B) having no alkenyl group can be prepared. Thus, the method of producing for the cement admixture by copolymerization of a composition, as a raw material, containing a non-polymerizable (poly)alkylene glycol (B) having no alkenyl group in addition to the monomer constituents containing an unsaturated (poly)alkylene glycol ether monomer (a) and a maleic acid monomer (b) is also one preferred mode in the practice of the present invention.

The unsaturated (poly)alkylene glycol ether monomer (a) used in the present invention can be produced, for example, by causing 1 to 500 moles of at least one alkylene oxide to add to an unsaturated alcohol such as allyl alcohol or methallyl alcohol. At the addition reaction, when a compound containing an active hydrogen such as a saturated alcohol other than the above-mentioned unsaturated alcohol (for example, methanol or ethanol) or water exists in the reaction system, a composition which contains a (poly)alkylene glycol as a byproduct, can be obtained by using the above active hydrogen as a starting material, in addition to the main product monomer (a). In the present invention, without requiring removal of a (poly)alkylene glycol produced as a byproduct at the time of the production of the above-mentioned monomer (a), the copolymerization reaction of a composition containing the (poly)alkylene glycol as the byproduct in addition to the monomer (a), a main product, can be carried out to produce the copolymer (A). Accordingly, the cement admixture comprising the above-mentioned copolymer (A) and the non-polymerizable (poly)alkylene glycol (B) having no alkenyl group can be easily obtained. Thus, the above-mentioned composition containing a non-polymerizable (poly)alkylene glycol (B) having no alkenyl group in addition to the monomer constituents containing an unsaturated (poly)alkylene glycol ether monomer (a) and a maleic acid monomer (b) is preferably a composition containing a non-polymerizable (poly)alkylene glycol (B) having no alkenyl group produced as a byproduct at the time of the production of the monomer (a).

When the above-mentioned (poly)alkylene glycol as a byproduct in the producing process of the monomer (a) is a (poly)alkylene glycol containing hydrogen atoms at both terminals, for example, (poly)ethylene glycol or (poly) ethylene (poly) propylene glycol, the molecular weight of the (poly)alkylene glycol obtained by using water containing two active hydrogen as a starting material is higher than that of the monomer (a) obtained by using an unsaturated alcohol containing one active hydrogen as a starting material. In this case, the molecular weight of the (poly)alkylene glycol is same or twice level of that of the monomer (a). Further, after the production of the copolymer (A), further, the non-polymerizable (poly)alkylene glycol (B) having no alkenyl group may be added and a non-polymerizable (poly)alkylene glycol (B) having no alkenyl group to be added may be the same as or different from the non-polymerizable (poly)alkylene glycol (B) having no alkenyl group contained as the byproduct.

At the time of producing the copolymer (A), as a raw material, a composition containing an oxyalkylene antifoaming (defoaming) agent in addition to the above-mentioned unsaturated (poly)alkylene glycol ether monomer (a), the above-mentioned maleic acid monomer (b), and the non-polymerizable (poly)alkylene glycol (B) having no alkenyl group may be subjected to copolymerization reaction to prepare a cement admixture comprising the copolymer (A), the non-polymerizable (poly)alkylene glycol (B) having no alkenyl group, and the oxyalkylene defoaming agent. If being mixed with the copolymer (A), an oxyalkylene defoaming agent with a high hydrophobicity is easy to be isolated and thus makes the storage property unstable. However, as described above, a cement admixture with excellent storage stability can be obtained by copolymerizing a composition, as a raw material, previously mixed with the oxyalkylene defoaming agent.

Suitable as the oxyalkylene antifoaming agent (oxyalkylene type antifoaming agent) are polyoxyalkylene such as (poly)oxyethylene(poly)oxypropylene adduct; polyoxyalkylene alkyl ether such as diethylene glycol heptyl ether, polyoxyethylene oleyl ether, polyoxypropylene butyl ether, polyoxyethylenepolyoxypropylene 2-ethylhexyl ether, and higher ($C_{12}$-$C_{14}$) alcohol-oxyethyleneoxypropylene adduct; polyoxyalkylene (alkyl)aryl ether such as polyoxypropylene phenyl ether and polyoxyethylene nonylphenyl ether; acetylene ether produced by addition polymerization of an alkylene oxide onto an acetylene alcohol such as 2,4,7,9-tetramethyl-5-decyne-4,7-diol, 2,5-dimethyl-3-hexyne-2,5-diol or 3-methyl-1-butyn-3-ol; (poly)oxyalkylene fatty acid ester such as diethylene glycol oleate, diethylene glycol laurate and ethylene glycol distearate; (poly) oxyalkylenesorbitan fatty acid ester such as polyoxyethylenesorbitan monolaurate and polyoxyethylenesorbitan trioleate; (poly)oxyalkylene alkyl(aryl) ether sulfate ester salt such as polyoxypropylene methyl ether sulfate sodium salt and polyoxyethylene dodecylphenyl ether sulfate sodium salt; (poly)oxyalkylene alkylphosphate ester such as polyoxyethylene stearyl phosphate; (poly)oxyalkylenealkylamine such as polyoxypropylenepolyoxyethylenelaurylamine (which is an adduct of 1 to 20 moles of a propylene oxide(s) and 1 to 20 moles of an ethylene oxide(s), etc.) and hardened beef tallow fatty acid-derived amine, which is an adduct of an alkylene oxide(s) (which is an adduct of 1 to 20 moles of a propylene oxide(s) and 1 to 20 moles of an ethylene oxide(s), etc.); polyoxyalkyleneamide, etc. The above oxyalkylene antifoaming agent may be used singly or two or more of them may be used in combination.

In the above-mentioned composition mixed with the oxyalkylene antifoaming agent, the mixing ratio of the oxyalkylene antifoaming agent is preferably 0.01 to 10% by mass relative to the total mass of whole monomers used for copolymerization reaction. More preferably is 0.05 to 5% by mass.

In the above-mentioned composition which comprising the unsaturated (poly)alkylene glycol ether monomer (a) and the non-polymerizable (poly)alkylene glycol (B) having no alkenyl group used for copolymerization reaction, the proportion of the (poly)alkylene glycol (B) is preferably not more than 50% by mass relative to 100% by mass of the monomer (a). When the proportion exceeds 50% by mass, the monomer concentration may decrease during polymerization reaction, hence the molecular weight of the copolymer (A) may unfavorably decrease. More preferably is not more than 40% by mass, still more preferably not more than 30% by mass, particularly preferably not more than 20% by mass. On the other hand, the proportion is preferably not less than 0.5% by mass. For being less than 0.5% by mass, the proportion of the non-polymerizable (poly)alkylene glycol (B) having no alkenyl group obtained as a byproduct in the producing process of the monomer (a) must be decreased, in order to decrease it, a long time is needed for conducting dehydration process to remove an impurity comprising an active hydrogen such as water existing in various materials used for addition reaction of an alkylene oxide such as an unsaturated alcohol, at the wall face of the reaction apparatus or in the gas phase, from the reaction system and further, or purification process for removing non-polymerizable (poly)alkylene glycol (B) having no alkenyl group after completion of addition reaction of an alkylene oxide is required, hence the productivity of the monomer (a) may decrease. Thus, the proportion is more preferably not less than 1% by mass, still more preferably not less than 2% by mass, particularly preferably not less than 2.5% by mass. The preferable ranges of the proportion is 0.5 to 50% by mass, more preferably 1 to 40% by mass, still more preferably 2 to 30% by mass, particularly preferably 2.5 to 20% by mass.

In the method for producing the cement admixture of the present invention, as the above-mentioned unsaturated (poly)alkylene glycol ether monomer (a), it may be added after production of the copolymer (A). However, it is preferable to employ a method in which the polymerization reaction is stopped at the time when the unsaturated (poly) alkylene glycol ether monomer (a) still remains in an amount of to 100% by mass relative to 100% by mass of the copolymer (A) at the time of production of the copolymer (A). Consequently, a cement admixture composition containing, in addition to the copolymer (A), the unsaturated (poly)alkylene glycol ether monomer (a) 1 to 100% by mass to the copolymer (A) can be prepared. When the ratio of the remaining unsaturated (poly)alkylene glycol ether monomer (a) is less than 1% by mass, the workability of a concrete composition probably becomes insufficient. When it exceeds 100% by mass, the dispersing ability for cement is probably deteriorated. It is more preferable that polymerization reaction is stopped at the time when the unsaturated (poly) alkylene glycol ether monomer (a) still remains in an amount of 2% or more by mass to the copolymer (A), still more preferably remains 3% or more by mass, particularly preferably remains 4% or more by mass, most preferably remains 5% or more by mass. On the other hand, more preferably remains 90% or less by mass, still more preferably remains 80% or less by mass, particularly preferably remains 70% or less by mass, most preferably remains 50% or less by mass. Further, as for the range of remaining amount of the monomer, it is preferable to stop at the time when the monomer (a) still remains in an amount of 2 to 100% by mass, more preferably remains 3 to 90% by mass, still more preferably remains 4 to 80% by mass, particularly preferably remains 5 to 70% by mass, most preferably remains 5 to 50% by mass.

In addition, after production of copolymer (A), the unsaturated (poly)alkylene glycol ether monomer (a) may be further added. The unsaturated (poly)alkylene glycol ether monomer (a) added and the unsaturated (poly)alkylene glycol ether monomer (a) used as monomer constituent for copolymerization reaction may be the same or different.

The preferred method for producing the cement mixture of the present invention comprises carrying out copolymerization reaction using a composition which comprises a non-polymerizable (poly)alkylene glycol (B) having no alkenyl group as a starting material, in addition to monomer composition comprising an unsaturated (poly)alkylenegylcol ether monomer (a) and a maleic acid monomer (b), and stopping the polymerization reaction at the time when the unsaturated (poly)alkylene glycol ether monomer (a) still remains in an amount of 1 to 100% by mass relative to 100% by mass of the copolymer (A). In this manner, the composition which comprises three components of the copolymer (A), the unsaturated (poly)alkylene glycol ether monomer (a), and the non-polymerizable (poly)alkylene glycol (B) having no alkenyl group can be obtained, and necessity is accepted, by further adding the additive, which is to be mentioned later herein, the cement admixture of the present invention can be obtained easily.

The cement admixture of the present invention further preferably comprising at least one additive selected from the group consisting of (C1) a setting accelerator, (C2) at least one compound selected from oxycarboxylic acid, its salt, saccharide, and sugar alcohol, and (C3) a sulfonic acid type dispersant containing a sulfonic acid group in the molecule.

With respect to the above-mentioned additives, the setting accelerator (C1) has functions of sufficiently drawing the function of the copolymer (A) in order to improve the dispersing ability of a cement composition and, also, accelerating the hardening of the cement composition at a low temperature when the cement composition is applied and hardened. In the present invention, based on the synergic effects of four components; the copolymer (A), the monomer (a), the non-polymerizable (poly)alkylene glycol (B) having no alkenyl group, and the setting accelerator (C1), addition of the setting accelerator (C1) gives a cement admixture which exhibits high dispersing ability and slump loss preventing ability even in a high water reducing ratio range and, also, exhibits viscosity decreasing ability, moreover shortening the hardening time at a low temperature.

Suitable as the setting accelerator (C1) are, as inorganic compound, chloride such as calcium chloride, sodium chloride, potassium chloride, magnesium chloride and iron chloride; nitrite such as calcium nitrite, sodium nitrite and potassium nitrite; nitrate such as calcium nitrate, sodium nitrate and potassium nitrate; sulfate such as calcium sulfate, sodium sulfate and potassium sulfate; thiosulfate salt such as calcium thiosulfate, sodium thiosulfate and potassium thiosulfate; isothiocyanate such as sodium isothiocyanate; alkali such as sodium hydroxide and potassium hydroxide; carbonate such as calcium carbonate, sodium carbonate and potassium carbonate; calcium halide such as calcium bromide and calcium iodide, etc. On the other hand, suitable are, as organic compound, amine such as diethanolamine and triethanolamine; calcium salt of organic acid such as calcium formate and calcium acetate, etc. Among them, calcium salt, which can easily dissolve in water, such as calcium chloride, calcium nitrite, calcium nitrate, calcium thiosulfate, calcium bromide, calcium iodide, calcium formate and calcium acetate is preferably used. More preferably is calcium chloride or calcium nitrite as inorganic compound, and calcium formate as organic compound.

Regarding chloride such as calcium chloride or the like, since chloride ion causes corrosion of concrete reinforcing rods, they are preferable to be used for the case that a cement composition is used for reinforcing rod-free concrete or concrete reinforced with carbon fibers and glass fibers except the rod-reinforced concrete. Meanwhile, the above-mentioned calcium salt easily soluble in water such as calcium nitrite, calcium nitrate, calcium formate and the like besides calcium chloride are not particularly limited and usable widely for optional applications. In particular, calcium nitrate is preferably used for rod-reinforced concrete since it has corrosion preventing effect, and combinations of two or more species of setting accelerators containing calcium nitrate as an essential constituent, e.g., combination of calcium nitrite and calcium chloride, combination of calcium nitrate and sodium thiocyanate and the like are possible.

The ratio of the above-mentioned copolymer (A) and setting accelerator (C1), that is, the mass ratio (% by mass) of the setting accelerator (C1) to the copolymer (A) on the basis of solid matters (non-volatile components) is properly in a range of 1 to 10000% by mass. When it is less than 1% by mass, it may become impossible to efficiently carry out hardening of the cement composition at a low temperature. When it exceeds 10000% by mass, during the laying work of the cement composition, the dispersing ability is not probably kept sufficient. It is preferably 30 to 5000% by mass and more preferably 100 to 1000% by mass.

In the present invention, the cement composition comprising the cement admixture containing the above-mentioned setting accelerator (C1), cement, and water is preferably undertaken construction and hardened at a temperature condition of 30° C. or less. That is, the hardening temperature of the cement composition is preferably 30° C. or less. Accordingly, in the case of using the cement admixture comprising three components of the copolymer (A), the monomer (a), and the non-polymerizable (poly)alkylene glycol (B) having no alkenyl group, the cement admixture can sufficiently exhibit the functions of shortening the hardening time and thus efficiently and easily applying and hardening work of the cement composition while keeping the fluidity of the cement composition stable. Thus, the method for producing a cement hardened product, comprising: executing of a cement composition comprising the cement admixture containing the setting accelerator (C1), cement and water; and hardening the cement composition at a temperature condition of 30° C. or less is also one of the present invention.

In the method for producing the cement hardened product, in the case the fluidity of the cement composition is improved by using the cement admixture, if an accelerator or the like is used in combination since it takes a long time to harden the cement composition at a hardening temperature of 30° C. or less, the hydration reaction of the cement and water is accelerated in the execution of the cement composition and, along with the partial formation of the cement hardened product, the cement admixture or the like is taken in the cement hardened product and, accordingly, the cement admixture cannot sufficiently draw the function of it to result in insufficient fluidity of the cement composition. In the present invention, even if the hardening temperature is 30° C. or less, three components of the copolymer (A), the monomer (a), and the non-polymerizable (poly)alkylene glycol (B) having no alkenyl group are used for improving the fluidity of the cement composition and, further, the setting accelerator (C1) capable of accelerating the curing of the cement composition is used, so that it is made possible to sufficiently exhibit the function of the setting accelerator (C1) in the hardening work of the cement composition as well as draw the effects of these three components in the execution of the cement composition.

That is, in the present invention, the three components of the copolymer (A), the monomer (a), and the non-polymerizable (poly)alkylene glycol (B) having no alkenyl group are used in combination with the setting accelerating agent (C1), so that it is made possible to efficiently and easily carry out the work of producing the cement hardened product in a shortened hardening time while the effects of these three components being kept high and to more sufficiently draw the properties of the cement hardened product. When the hardening temperature exceeds 30° C., the hardening of the cement composition can sufficiently be promoted without using the setting accelerator (C1); therefore, the setting accelerator (C1) sufficiently exhibits the function when the hardening temperature is 30° C. or less. In the above-mentioned method for producing the cement hardened product, in order to sufficiently draw the function, the temperature condition may be 30° C. or less either a part of or the entire period of the hardening of the cement composition.

A preferable embodiment of the above-mentioned method for producing the cement hardened product is application of the method for performing the execution and the hardening work in winter and, for example, the method is applied in the case the hardening temperature is 25° C. or less. The hardening temperature is further preferably 20° C. or less, and particularly preferably 15° C. or less. On the contrary, it is necessary to set the temperature-range in which the cement composition does not freeze, at the time of hardening the cement composition. Therefore, the hardening temperature is preferably 0° C. or more.

In the present invention, the execution means the process after the production of the cement composition and before the hardening of the cement composition in a field work. For example, the process includes steps of transporting the cement composition by an agitator vehicle (a ready mixed concrete mixer vehicle) transferring the composition by a pump or the like, and pouring the composition in a forming frame or the like. The hardening temperature means the ambient temperature at the time of hardening the cement composition; the executing temperature means the temperature at the time of executing the cement composition.

With respect to the above-mentioned additives, at least one compound (C2) selected from oxycarboxylic acid, its salt, saccharide, and sugar alcohol has a function of retarding the hardening of the cement composition at the time of execution of the cement composition in order to sufficiently prevent the decrease of the fluidity of the cement composition that is caused because of the entrainment of the copolymer (A), which is used for improving the fluidity of the cement composition, in the cement hardened product and consequent inhibition of the function of the copolymer (A) along with the promotion of the hydration reaction of the cement and water and partial formation of the cement hardened product. In the present invention, addition of such compound (C2) makes it possible to provide the high dispersing ability and the viscosity decreasing ability even in a high water reducing ratio region, to obtain the cement hardened product with high strength and excellent durability, and prevent the fluidity decrease at the time of a high temperature on the basis of the synergic effects of four components of the copolymer (A), the monomer (a), the non-polymerizable (poly)alkylene glycol (B) having no alkenyl group, and the compound (C2).

In the above-mentioned additive, the compound (C2) is at least one compound selected from oxycarboxylic acid, its salt, saccharide, and sugar alcohol. Suitable as the oxycarboxylic acid and its salt are, for example, gluconic acid, glucoheptonic acid, arabonic acid, malic acid, citric acid, and inorganic or organic salt thereof such as sodium, potassium, calcium, magnesium, ammonium and triethanol ammonium salt, etc. Suitable as the saccharide are, for example, monosaccharide such as glucose, fructose, galactose, saccharose, xylose, apiose, ribose and invert sugar, oligosaccharide such as disaccharide and trisaccharide, such oligosaccharide as dextrin, polysaccharide such as dextran, and other saccharides such as molasses containing these. Suitable as the sugar alcohol are, for example, sorbitol, etc. Among them, oxycarboxylic acid or its salt is preferably used as the above compound (C2), more preferably gluconic acid or its salt. The compound (C2) may be used singly or two or more of them may be used in combination.

The ratio of the above-mentioned copolymer (A) and at least one compound (C2) selected from oxycarboxylic acid, its salt, saccharide, and sugar alcohol, that is, the mass ratio (% by mass) of the compound (C2) to the copolymer (A) on the basis of solid matters (non-volatile components) is properly in a range of 0.1 to 1000% by mass. When it is less than 0.1% by mass, during the execution of the cement composition, the dispersing ability is not probably kept sufficient. When it exceeds 1000% by mass, it probably becomes impossible to efficiently carry out hardening of the cement composition. It is preferably 1 to 400% by mass and more preferably 3 to 400% by mass.

In the present invention, the cement composition comprising the above-mentioned compound (C2)—containing cement admixture, cement, and water is preferably subjected to the execution at a temperature of 20° C. or more. Consequently, decrease of the fluidity of the cement composition can be prevented and the execution of the cement composition can efficiently and easily be carried out in the case the cement admixture comprising three components of copolymer (A), the monomer (a), and the non-polymerizable (poly)alkylene glycol (B) having no alkenyl group is used. Thus, the method for executing a cement composition comprising: executing the cement composition comprising the cement admixture containing at least one compound (C2) selected from oxycarboxylic acid, its salt, saccharide, and sugar alcohol, cement and water at a temperature condition of 20° C. or more is also one of the present invention.

In the execution of the above-mentioned cement composition, in the case of using the cement admixture comprising three components of the copolymer (A), the monomer (a), and the non-polymerizable (poly)alkylene glycol (B) having no alkenyl group, since the fluidity of the cement composition is excellent, the work using the cement composition can efficiently and easily be carried out. When the executing temperature becomes high, the functions of these three components may be deteriorated. In the present invention, these three components of the copolymer (A), the monomer (a), and the non-polymerizable (poly)alkylene glycol (B) having no alkenyl group are used and, further, at least one compound (C2) selected from oxycarboxylic acid, its salt, saccharide, and sugar alcohol is used, so that even if the executing temperature is 20° C. or more, the functions of the three components are prevented from deterioration and, accordingly, the execution of the cement composition can efficiently and easily be carried out.

A preferable embodiment of the above-mentioned method for executing of the above-mentioned cement composition is application of the method for performing the execution in summer and, for example, the method is applied in the case the executing temperature is 25° C. or more. The executing temperature is further preferably 30° C. or more. On the contrary, it is necessary to set the temperature-range in which the water in the cement composition does not boil, at the time of executing the cement composition. Therefore, the executing temperature is preferably 100° C. or less, more preferably 80° C. or less.

In the additive, the sulfonic acid type dispersant (C3) containing a sulfonic acid group in the molecule is the dispersant which exhibits dispersing ability for cement due to the mainly sulfonic acid group-induced electrostatic repulsion. In the present invention, addition of such a sulfonic acid type dispersant (C3) makes it possible to retain the high dispersing ability even in high temperature environments, to provide stable dispersing ability regardless of the lot Number of the cement, and further to suppress segregation of the materials such as water, gravel or the like even in poorly admixed concrete and accordingly to improve the workability on the basis of the synergic effects of four components of the copolymer (A), the monomer (a), the non-polymerizable (poly)alkylene glycol (B) having no alkenyl group, and the sulfonic acid type dispersant (C3) having a sulfonic acid group in the molecule.

Various conventional sulfonic acid type dispersants may be used as the sulfonic acid type dispersant (C3), but a compound containing an aromatic group in the molecule is preferred. Suitable are, for example, there may be mentioned (poly)alkyl aryl sulfonic acid salt such as naphthalenesulfonic acid-formaldehyde condensate, methylnaphthalenesulfonic acid-formaldehyde condensate, and anthracenesulfonic acid-formaldehyde condensate; melamineformalin resin sulfonic acid salt such as melaminesulfonic acid-formaldehyde condensate; aromatic aminosulfonic acid salt such as aminoarylsulfonic acid-phenol-formaldehyde condensate; ligninsulfonic acid salts such as ligninsulfonic acid salt and modified ligninsulfonic acid salt; polystyrenesulfonic acid salt, and like sulfonic acid type dispersant. Suitable as sulfonates thereof are alkali metal sulfonate, alkaline earth metal sulfonate, ammonium salt, and organic ammonium salt, etc. In the case of using a concrete which water/cement ratio in concrete is middle to high level (water/cement ratio is 0.4 to 0.7% by mass), or a poor concrete with the unit cement amount of 300 kg/m$^3$ or lower (preferably 200 to 300 kg/m$^3$, more preferably 250 to 300 kg/m$^3$), ligninsulfonic acid salt dispersant is preferably used. On the other hand, in the case of using a concrete which water/cement ratio in concrete is at middle to low level (water/cement ratio is 0.15 to 0.6% by mass), required to have higher dispersion ability, the dispersant such as (poly) alkyl aryl sulfonic acid salt dispersant, melamineformalin resin sulfonic acid salt dispersant, aromatic aminosulfonic acid salt or polystyrenesulfonic acid salt dispersant are preferably used.

The ratio of the copolymer (A) and the sulfonic acid type dispersant (C3) containing a sulfonic acid group in the molecule, namely the mass proportion (% by mass) of the sulfonic acid type dispersant (C3) containing a sulfonic acid group in the molecule relative to the copolymer (A) calculated on the solid content (nonvolatile component) basis, is suitably 1 to 10000% by mass. When it is less than 1% by mass, stabilized dispersing ability maybe not exhibited, on the contrary, when it is more than 10000% by mass, dispersion retaining ability may be insufficient. The mass proportion varies depending on the performance balance between the copolymer (A) and the sulfonic acid type dispersant (C3) containing a sulfonic acid group in the molecule used in combination, however, preferably 5 to 2000% by mass, more preferably 10 to 1000% by mass, still more preferably 25 to 400% by mass.

As for the cement admixture containing the above sulfonic acid type dispersant (C3), it is preferable that an oxycarboxylic acid compound (D) is contained further. Therefore, the cement admixture can demonstrate more excellent dispersion retaining ability even if it is under high temperature.

Suitable as the oxycarboxylic acid compound are preferably oxycarboxylic acid or its salt containing 4 to 10 carbon atoms, for example, oxycarboxylic acid or its salt in the above compound (C2) as mentioned above. Among them, gluconic acid or its salt is preferably used. In particular, when using the concrete with poor mixture, ligninsulfonic acid salt dispersant as the sulfonic acid type dispersant (C3), and gluconic acid or its salt as the oxycarboxylic acid compound (D) are preferably used.

The ratio of the copolymer (A) and the oxycarboxylic acid compound (D), namely (the copolymer (A)/the oxycarboxylic acid compound (D)) (% by mass) on the basis of solid content, is preferably 1 to 99/99 to 1, more preferably 5 to 95/95 to 5, still more preferably 10 to 90/90 to 10, particular preferably 20 to 80/80 to 20. Further, the ratio of the copolymer (A), the sulfonic acid type dispersant (C3), and the oxycarboxylic acid compound (D), namely (the copolymer (A)/the sulfonic acid type dispersant (C3)/the oxycarboxylic acid compound (D)) (% by mass) on the basis of solid content, is preferably 1 to 98/1 to 98/1 to 98, more preferably 5 to 90/5 to 90/5 to 90, still more preferably 10 to 90/5 to 85/5 to 85, particular preferably 20 to 80/10 to 70/10 to 70.

The cement admixture of the present invention comprises, as essential constituents, three components of the copolymer (A), the unsaturated (poly)alkylene glycol ether monomer (a) and the non-polymerizable (poly)alkylene glycol (B) having no alkenyl group, if necessary further comprises at least one additive selected from the group consisting of (C1), (C2) and (C3). The cement admixture may be used, in the form of an aqueous solution, or in the form of a powder prepared by neutralizing with the hydroxide of a divalent metal such as calcium or magnesium to give a polyvalent metal salt, followed by drying, or by being carried on an inorganic powder such as a fine silicic powder, followed by drying, or drying and solidifying it in a thin film-like state on a support by using a drum type drying apparatus, a disk type drying apparatus or a belt type drying apparatus and then crushing the resulting dried product. Further, when the above-mentioned additive is in form of a powder, the cement admixture may be used by mixing the additives, after the composition comprising the three constituents of the copolymer (A), the unsaturated (poly)alkylene glycol ether monomer (a) and the non-polymerizable (poly)alkylene glycol (B) having no alkenyl group is powdered by the above-mentioned method.

In the case of adding the cement admixture of the present invention to the cement composition, the cement admixture prepared by previously mixing the three components of the copolymer (A), the unsaturated (poly)alkylene glycol ether monomer (a), and the non-polymerizable (poly)alkylene glycol (B) having no alkenyl group as well as the above-mentioned additives if necessary may be added or the respective components may be added separately. For example, in the case the transportation distance from a site where the cement composition is mixed to a execution field is long and the transportation takes a long time, if the above-mentioned three components are previously mixed with the cement composition and the setting accelerator (C1) is added immediately before the execution, the time from the execution to the hardening can be adjusted to be constant even if the transportation time is prolonged because of traffic jam or the like. In addition, from a viewpoint of the stability of the cement admixture with the lapse of time, at the time of producing the cement composition, it is preferable to add the above-mentioned three components or four components further including the oxycarboxylic acid compound (D) separately from the sulfonic acid type dispersant (C3) containing a sulfonic acid group in the molecule. It is also possible to previously mix the above-mentioned three components or at least four components further including the above-mentioned additives with a cement composition containing such as a dry mortar containing no water and to use the composition as a premixed product for plastering, floor finishing, grout and the like.

The cement admixture of the present invention can be used in various hydraulic material, namely in cement composition such as cement and gypsum, etc., or the other hydraulic material. Preferred examples of the hydraulic composition comprising a hydraulic material, water and the cement admixture of the present invention, if necessary together with a fine aggregate (e.g. sand) or a coarse aggregate (e.g. crushed stone), are cement paste, mortar, concrete and plaster and the like Among the hydraulic compositions mentioned above, cement composition in which cement is used as the hydraulic material is in commonest use, and the cement composition comprises the cement admixture of the present invention, cement and water. Such cement composition is also one of the present invention.

In the above cement composition, cement is not particularly limited. Suited for use are portland cement species (ordinary, high-early-strength, ultra high-early-strength, moderate heat, sulfate persisting, and low alkali grade thereof), various blended cement species (blast furnace slag cement, silica cement, fly ash cement), white portland cement, alumina cement, ultra rapid hardening cement (one clinker ultra rapid hardening cement, two clinker ultra rapid hardening cement, magnesium phosphate cement), grouting cement, oil-well cement, lower calorific value cement (lower calorific value blast furnace slag cement, fly ash-mixed lower calorific value blast furnace slag cement, high belite cement), ultrahigh strength cement, cement-based hardening material, and economical cement (cement produced by using at least one of municipal refuse incineration ash and sewage sludge incineration ash as a material). Fine powders such as blast furnace slag, fly ash, cinder ash, clinker ash, husk ash, silica fume, silica powder and limestone powder, and gypsum may further be added. Usable as the aggregate are gravel, crushed stone, water granulated blast furnace slag, recycled concrete aggregate and, further, fireproof aggregates such as silica stone-based, clay-based, zircon-based, high alumina, silicon carbide-based, graphite-based, chrome-based, chrome-magnesite, and magnesia-based ones.

As for the unit water amount, the amount of cement and the water/cement ratio in each cubic meter of the above cement composition, the unit water amount of 100 to 185 kg/m$^3$, the amount of cement as used of 200 to 800 kg/m$^3$, and the water/cement ratio (mass ratio) of 0.1 to 0.7 are preferred. More preferably, the unit water amount of 120 to 175 kg/m$^3$, the amount of cement as used of 250 to 800 kg/m$^3$, and the water/cement ratio (mass ratio) of 0.2 to 0.65 are recommended for wide use in poor to rich mixtures. The cement admixture of the present invention can be used in a high water reducing ratio range, namely a range where a water/cement ratio (by mass) is low, such as 0.15 to 0.5% by mass (preferably 0.15 to 0.4% by mass). Further, it can be used effectively for high strength concrete with a high unit cement amount and low water/cement ratio, and ultrahigh strength concrete in a range of low water/cement ratio (mass ratio) of 0.3 or lower, and poor concrete with the unit cement amount of 300 kg/m$^3$ or lower.

The amount of addition of the cement admixture of the present invention in the above cement composition, when it is used in mortar or concrete, for instance, in which hydraulic cement is used, is preferably 0.01 to 10.0% by mass based on the mass of cement calculated on the solid content basis. Consequently, various favorable effects, such as reduction in unit water amount, increase in strength and improvement in durability, are realized. When the above addition amount is lower than 0.01%, the performance characteristics may not become sufficient. Conversely, when it exceeds 10.0%, the effects will substantially reach the peak and this may be disadvantageous from the economical viewpoint. The range of the addition level is more preferably 0.02 to 5.0% by mass, still more preferably 0.05 to 3.0% by mass, particularly preferably 0.1 to 2.0% by mass.

Since the above-mentioned cement composition is excellent in the pump transportation and is provided with remarkably improved workability for execution, and has high fluidity, it is effective in ready mixed concrete, concrete for secondary concrete products (precast concrete), centrifugal molded concrete, vibrating compacted concrete, steam cured concrete, concrete for spraying and the like and, further, it is effective also in mortar and concrete species required to have high fluidity, such as medium flowing concrete (concrete showing a slump value of 22 to 25 cm), high flowing concrete (concrete showing a slump value of not less than 25 cm and a slump flow value of 50 to 70 cm), self-filling concrete and self-leveling materials. In particular, the cement admixture comprising the setting accelerator (C1) is effective to shorten the hardening time, to accelerate the strengthening, and to improve the productivity owing to the shortened time to remove the forming frame, so that it is preferably used for concrete for secondary concrete products (precast concrete).

The above-mentioned cement composition may contain conventionally known cement dispersant other than the sulfonic acid type dispersant (C3) containing a sulfonic acid group in the molecule, and two or more conventionally known cement dispersants may be used in combination. In the case of using such conventionally known cement dispersants, the mixing ratios by mass of the cement admixture of the present invention and the known cement dispersants may appropriately be set depending on the species, the mixing of the dispersants and the executing conditions. For example, it is preferably 1 to 99/99 to 1 by mass (% by mass) on the basis of the solid matters. More preferred is 5 to 95/95 to 5, still more preferred is 10 to 90/90 to 10. As for the above-mentioned conventionally known cement dispersants used in combinations, the following are suitable.

Various polycarboxylic acid type dispersants containing (poly)oxyalkylene group and carboxyl group such as copolymer of a polyalkylene glycol mono(meth)acrylate monomer, a (meth) acrylic acid monomer and a monomer copolymerizable with these monomers, as described in Japanese Kokoku Publication Sho-59-18338 and Japanese Kokai Publication Hei-07-223852; copolymer of an unsaturated polyalkylene glycol ether monomer which containing an alkenyl group containing 5 carbon atoms, a maleic acid monomer or a (meth)acrylic acid monomer, and a monomer copolymerizable with these monomers, as described in Japanese Kokai Publication Hei-10-236858 and Japanese Kokai Publication 2001-220417; hydrophilic graft polymer obtained by graft polymerization of unsaturated carboxylic monomer to polyether compound, as described in Japanese Kokai Publication Hei-07-53645, Japanese Kokai Publication Hei-08-208769, and Japanese Kokai Publication Hei-08-208770.

In the present invention, in the case of using a polycarboxylic acid type dispersant containing a (poly)oxyalkylene group and a carboxyl group in the molecule, the polymer different from the copolymer (A) of the cement admixture of the present invention is used in combination so as to obtain a cement admixture having excellent balance between the initial dispersing ability and the dispersing ability retention particularly in a high water reducing ratio range.

The cement composition may further comprise one or more of other known cement additives (ingredients) such as listed below under (1) to (20):

(1) Water-soluble polymeric substance: unsaturated carboxylic acid polymer such as polyacrylic acid (sodium salt), polymethacrylic acid (sodium salt), polymaleic acid (sodium salt), and acrylic acid-maleic acid copolymer sodium salt; nonionic cellulose ether such as methylcellulose, ethylcellulose, hydroxymethylcellulose, hydroxyethylcellulose, carboxymethylcellulose, carboxyethylcellulose and hydroxypropylcellulose; polysaccharide derivative derived from alkylated or hydroxyalkylated derivative of polysaccharide, such as methylcellulose, ethylcellulose, hydroxyethylcellulose and hydroxypropylcellulose, by substitution of a part or all of hydroxyl hydrogen atoms with a hydrophobic substituent comprising a hydrocarbon chain containing 8 to 40 carbon atoms as a partial structure and an ionic hydrophilic substituent containing a sulfonic acid group or a salt thereof as a partial structure; yeast glucan, xanthan gum, â-1,3-glucan (linear or branched, e.g. curdlan, paramylon, pachyman, scleroglucan, rhamnalan) and like polysaccharides produced by microbial fermentation; polyacrylamide; polyvinyl alcohol; starch; starch phosphoric acid ester; sodium alginate; gelatin; amino-containing acrylic acid copolymer and quaternization product derived therefrom.

(2) Polymer emulsion: copolymer of various vinyl monomer such as alkyl (meth)acrylate.

(3) Setting Retarder other than at least one compound (C2) selected from oxycarboxylic acid, its salt, saccharide, and sugar alcohol: magnesium silicofluoride; phosphoric acid and salt thereof, or borate ester; aminocarboxylic acid and salt thereof; alkali-soluble protein; humic acid; tannic acid; phenol; polyhydric alcohol such as glycerol; phosphonic acid and derivative thereof, such as aminotri (methylenephosphonic acid), 1-hydroxyethylidene-1,1-diphosphonic acid, ethylenediaminetetra(methylenephosphonic acid), diethylenetriaminepenta (methylenephosphonic acid), and alkali metal or alkaline earth metal salt thereof, etc.

(4) High-early-strength agent: alumina cement, calcium aluminosilicate, etc.

(5) Mineral oil-based antifoaming agent: kerosene, liquid paraffin, etc.

(6) Fat- or oil-based antifoaming agent: animal or vegetable oil, sesame oil, castor oil, alkylene oxide adduct derived therefrom, etc.

(7) Fatty acid-based antifoaming agent: oleic acid, stearic acid, and alkylene oxide adduct derived therefrom, etc.

(8) Fatty acid ester-based antifoaming agent: glycerol monoricinolate, alkenylsuccinic acid derivative, sorbitol monolaurate, sorbitol trioleate, natural wax, etc.

(9) Oxyalkylene antifoaming agent

(10) Alcohol antifoaming agent: octyl alcohol, hexadecyl alcohol, acetylene alcohol, glycol, etc.

(11) Amide antifoaming agent: acrylate polyamine, etc.

(12) Phosphate ester antifoaming agent: tributyl phosphate, sodium octylphosphate, etc.

(13) Metal salt antifoaming agent: aluminum stearate, calcium oleate, etc.

(14) Silicone antifoaming agent: diemthylsilicone oil, silicone paste, silicone emulsion, organic group-modified polysiloxane (organosiloxane such as dimethylpolysiloxane), fluorosilicone oil, etc.

(15) Air-entraining (AE) agent: resin soap, saturated or unsaturated fatty acid, sodium hydroxystearate, lauryl sulfate, ABS (alkylbenzenesulfonate), LAS (linear alkylbenzenesulfonate), alkanesulfonate, polyoxyethylene alkyl(phenyl) ether, polyoxyethylene alkyl(phenyl) ether sulfate ester or salt thereof, polyoxyethylene alkyl(phenyl) ether phosphate ester or salt thereof, proteinic material, alkenylsulfosuccinate, â-olefinsulfonate, etc.

(16) Other surfactant: polyalkylene oxide derivative derived from aliphatic monohydric alcohol containing 6 to 30 carbon atoms within the molecule, such as octadecyl alcohol and stearyl alcohol, alicyclic monohydric alcohol containing 6 to 30 carbon atoms within the molecule, such as abietyl alcohol, monofunctional mercaptan containing 6 to 30 carbon atoms within the molecule, such as dodecyl mercaptan, alkylphenols containing 6 to 30 carbon atoms within the molecule, such as nonylphenol, amine containing 6 to 30 carbon atoms within the molecule, such as dodecylamine, or carboxylic acid containing 6 to 30 carbon atoms within the molecule, such as lauric acid and stearic acid, by addition of not less than 10 moles of an alkylene oxide such as ethylene oxide and/or propylene oxide; alkyldiphenyl ether sulfonic acid salt in which two sulfo-containing phenyl groups, which may optionally have an alkyl group or alkoxy group as a substituent, is bonded via ether bonding; various anionic surfactant; various cationic surfactant such as alkylamine acetate and alkyltrimethylammonium chloride; various nonionic surfactant; various amphoteric surfactant, etc.

(17) Waterproofing agent: fatty acid (salt), fatty acid ester, fat and oil, silicone, paraffin, asphalt, wax, etc.

(18) Corrosion inhibitor: nitrite salt, phosphate salt, zinc oxide, etc.

(19) Cracking reducing agent: polyoxyalkyl ether etc.

(20) Expansive additive: ettringite, coal-derived, etc.

As other conventional cement additive (ingredient), it may be mentioned cement wetting agent, thickening agent, segregation reducing agent, flocculant, drying shrinkage reducing agent, strength increasing agent, self-leveling agent, colorant, antifungal agent and so on. It is also possible to combinedly use a plurality of the cement additives (constituents) mentioned above.

The following combinations (1) to (4) of constituents other than cement and water in the above cement composition may be mentioned as particularly preferred embodiments:

(1) Combination of <1> a cement admixture of the present invention and <2> an oxyalkylene antifoaming agent as two essential constituents. Useable as the oxyalkylene antifoaming agent are polyoxyalkylene, polyoxyalkylene alkyl ether, polyoxyalkylene acetyl ether and polyoxyalkylene alkyl amine. Among them, polyoxyalkylene alkyl amine is particularly preferred. The proportion of the oxyalkylene antifoaming agent <2> is preferably 0.01 to 20% by mass relative to the cement admixture <1>.

(2) Combination of <1> a cement admixture of the present invention and <2> a material segregation reducing agent as two essential constituents. Usable as the material segregation reducing agent are various thickening agents such as nonionic cellulose ether, and compound containing, as partial structure, a hydrophobic substituent comprising a hydrocarbon chain containing 4 to 30 carbon atoms and a polyoxyalkylene chain resulting from addition of 2 to 300 moles, on average, of an alkylene oxide(s) containing 2 to 18 carbon atoms, among others. The mixing ratio, by mass, between the cement admixture <1> and material segregation reducing agent <2> is preferably 10/90 to 99.99/0.01, more preferably 50/50 to 99.9/0.1. A cement composition containing this combination is suited for use as high flowing concrete, self-filling concrete and self-leveling composition.

(3) Combination of <1> a cement admixture of the present invention, <2> a polycarboxylic acid type dispersant containing a (poly)oxyalkylene group and a carboxylic group in a molecule (this is a different polymer from the copolymer (A) in the cement admixture of the present invention), and <3> an oxyalkylene antifoaming agent as three essential constituents. The mixing ratio, by mass, between the cement admixture <1> and polycarboxylic acid type dispersant <2> is preferably 5/95 to 95/5, more preferably 10/90 to 90/10. The proportion of the oxyalkylene antifoaming agent <3> is preferably 0.01 to 20% by mass relative to the total mass of the cement admixture <1> and polycarboxylic acid type dispersant <2>.

(4) Combination of <1> a cement admixture of the present invention, <2> an oxyalkylene antifoaming agent, and <3> an air-entraining agent as three essential constituents. Useable as the oxyalkylene antifoaming agent are polyoxyalkylene, polyoxyalkylene alkyl ether, polyoxyalkylene acetyl ether and polyoxyalkylene alkyl amine. Among them, polyoxyalkylene alkyl amine is particularly preferred. The proportion of the oxyalkylene antifoaming agent <2> is preferably 0.01 to 20% by mass relative to the cement admixture <1>. The proportion of the air-entraining agent <3> is preferably 0.001 to 2% by mass relative to cement.

Having the above-mentioned constitutions, the cement admixture of the present invention exhibits high dispersing ability and slump loss preventing ability particularly in the high water reducing ratio range and, also, is provided with ability of decreasing the viscosity. In addition, the cement composition containing the cement admixture of the present invention gives concrete easy to be transported by a pump and excellent in workability, so that the workability can be improved and troubles in the execution can be solved.

When the setting accelerator (C1) is added further to such a cement admixture of the present invention, the obtained cement admixture exhibits the high dispersing ability and the slump loss preventing ability and, also, the viscosity decreasing capability, and sufficiently maintains these properties even in the high water reducing ratio range and moreover, shortens the hardening time. Further, according to the method for producing a cement hardened product of the present invention, the workability is improved and the troubles of the applying are solved and, also, the cement hardened product excellent in strength and durability can be obtained. Moreover, since the hardening time can be shortened at the time of low temperature while the fluidity of the cement composition being maintained, the cement composition such as a cement paste, a mortar or concrete may be subjected to the execution and hardened at a temperature condition of 30° C. or less to efficiently and easily produce the cement hardened product.

If a predetermined setting retarder (C2) is added, the high dispersing ability and the viscosity decreasing ability can be obtained even in the high water reducing ratio range and decrease of the fluidity can be prevented for a long duration even at a high temperature in summer. If such a cement admixture is added for the cement composition, decrease of the fluidity can be prevented for a long duration at a high temperature in summer and the viscosity of the cement composition can be decreased. Accordingly, the workability is improved and the troubles can be solved in the steps of transporting the cement composition by a pump or the like and filling a forming frame with the cement composition and, also, the cement hardened product excellent in the strength and the durability can be obtained.

Further, if the sulfonic acid type dispersant (C3) is added, the high dispersing ability is provided even in high temperature environments and stable dispersing ability is exhibited regardless of the lot Number of the cement. Further, even if the case of poorly admixed concrete, segregation of materials such as water and gravel can be suppressed and thus the workability can be improved. In addition, the cement composition containing such a cement admixture shows excellent fluidity and the problems on the quality control can be solved.

BEST MODE FOR CARRYING OUT THE INVENTION

The present invention is more specifically described below by way of the Examples. It must be noted, however, that the invention is not limited to these Examples alone. In the Examples, "part(s)" means "part(s) by mass" and "%" denotes "% by mass", unless otherwise specified.

In the Production Examples, production amount of the (poly)alkylene glycol obtained as a byproduct at the time of producing the unsaturated polyalkylene glycol ether monomer (a) were determined by the following conditions.

<Determination Conditions of Production Amount of Polyalkylene Glycol>

Apparatus: product of Shimadzu Corp., LC-10

Detector: differential refractometer (RI) detector (HITACHI 3350 RI MONITOR) (product of Hitachi Corp.)

Eluent: species: deionized water flow rate: 1.5 ml/min

Column: species: product of Showa Denko Corp., Shodex GF-310 (4.6×300 mm)

temperature: 40° C.

In the Production Examples, the conversion of each starting monomer and weight-average molecular weight of copolymer obtained was determined by the following conditions.

<Determination Conditions of Conversion of Starting Monomer>

Apparatus: product of JASCO Corp., Borwin

Detector: differential refractometer (RI) detector (HITACHI 3350 RI MONITOR) (product of Hitachi Corp.)

Eluent: species: acetonitrile/0.1% deionized water solution of phosphoric acid (50/50% by volume)

flow rate: 1.0 ml/min

Column: species: product of Tosoh Corp., ODS-120T+ODS-8OTs (each 4.6×250 mm)

temperature: 40° C.

<Weight-average Molecular Weight Determination Conditions of Copolymer>

Apparatus: Waters LCM1 (product of Waters Corp.)

Detector: differential refractometer (RI) detector (Waters 410) (product of Waters Corp.)

Eluent: species: acetonitrile/0.05 M deionized water solution of sodium acetate (40/60% by volume), adjusted to pH 6.0 with acetic acid
flow rate: 0.6 ml/min
Column: species: product of Tosoh Corp., TSK-GEL G4000SWXL+G3000SWXL+G2000SWXL+GUARD COLUMN (each 7.8×300 mm, 6.0×40 mm)
temperature: 40° C.
Calibration curve: polyethylene glycol standards

PRODUCTION EXAMPLE 1

A stainless-made high-pressure reaction vessel equipped with a thermometer, a stirrer, and nitrogen and alkylene oxide inlet tube was charged with 196 parts of methallyl alcohol (2-methyl-2-propene-1-ol) as an unsaturated alcohol and 3.1 parts of sodium hydroxide as a catalyst for addition reaction. Reaction vessel inside was purged with nitrogen with stirring and then heated to 150° C. in a nitrogen atmosphere. Then, under safe pressure, maintaining the temperature at 150° C., 6310 parts of ethylene oxide was introduced to the reaction vessel. The temperature was maintained at 150° C. until the alkylene oxide addition reaction was completed to drive the reaction to completion. The obtained reaction product (hereinafter referred to as "M-1") includes polyalkylene glycol (polyethylene glycol) as a byproduct, and an unsaturated polyalkylene glycol ether monomer (hereinafter referred to as "MAL-50") derived from methallyl alcohol by addition of 50 moles, on average, of ethylene oxide. The production amount of polyethylene glycol was 5.0% by mass relative to the unsaturated polyalkylene glycol ether monomer.

PRODUCTION EXAMPLES 2 TO 7

The same procedure as in Production Example 1 was followed except that the species and used amount of unsaturated alcohol, sodium hydroxide as the catalyst for addition reaction, and alkylene oxide were changed as shown in Table 1, to perform alkylene oxide addition reaction to the unsaturated alcohol, to give reaction products (M-2) to (M-7) which included an unsaturated polyalkylene glycol ether monomer and a polyalkylene glycol. Furthermore, all of alkylene oxide addition reactions were performed at 150° C., and when two species of alkylene oxide, ethylene oxide and propylene oxide were used, whole ethylene oxide addition to unsaturated alcohol was performed, and then propylene oxide addition was performed to obtain block type adduct. The production amount of the polyalkylene glycol as a byproduct relative to the unsaturated polyalkylene glycol ether monomer in obtained reaction product is shown in Table 1.

TABLE 1

| Reaction Product No. | Abbreviation of unsaturated polyalkylene glycol ether monomer | Unsaturated alcohol Species | Unsaturated alcohol Used amount (parts) | Ethylene oxide Used amount (parts) | Ethylene oxide Average molar number of addition | Propylene oxide Used amount (parts) | Propylene oxide Average molar number of addition | Sodium hydroxide Used amount (parts) | Byproduct polyalkylene glycol (non-polymerizable polyalkylen glycol having no alkenyl group) Species | Byproduct Production amount (%) |
|---|---|---|---|---|---|---|---|---|---|---|
| Production Ex. 1 | M-1 | MAL-50 | Methallyl alcohol | 196 | 6310 | 50 | — | — | 3.1 | Polyethylene glycol | 5.0 |
| Production Ex. 2 | M-2 | MAL-75 | Methallyl alcohol | 131 | 6325 | 75 | — | — | 3.1 | Polyethylene glycol | 5.3 |
| Production Ex. 3 | M-3 | MAL-100 | Methallyl alcohol | 98 | 6390 | 100 | — | — | 3.1 | Polyethylene glycol | 6.4 |
| Production Ex. 4 | M-4 | MAL-200 | Methallyl alcohol | 49 | 6726 | 200 | — | — | 3.1 | Polyethylene glycol | 12.0 |
| Production Ex. 5 | M-5 | MAL-70EO5PO | Methallyl alcohol | 70 | 3184 | 70 | 294 | 5 | 1.7 | Polyethylene polypropyleneglycol | 5.5 |
| Production Ex. 6 | M-6 | AL-50 | Allyl alcohol | 158 | 6154 | 50 | — | — | 3.1 | Polyethylene glycol | 2.5 |
| Production Ex. 7 | M-7 | AL-75 | Allyl alcohol | 105 | 6195 | 75 | — | — | 3.1 | Polyethylene glycol | 3.2 |

PRODUCTION EXAMPLE 8

Production of Cement Admixture (A-1)

A glass-made reaction vessel equipped with a thermometer, a stirrer, a dropping funnel, a nitrogen inlet tube, and a reflux condenser was charged with 279 parts of deionized water, 420.0 parts of the reaction product (M-1) obtained in Production Example 1 (containing 400 parts of MAL-50 and 20.0 parts of polyethylene glycol), and 41.4 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.363 parts of hydrogen peroxide and 6.89 parts of deionized water was added thereto. Then, an aqueous solution prepared by dissolving 0.470 parts of L-ascorbic acid in 8.92 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give a Cement admixture (A-1) according to the present invention.

PRODUCTION EXAMPLE 9

Production of Cement Admixture (A-2)

A glass-made reaction vessel equipped with a thermometer, a stirrer, a dropping funnel, a nitrogen inlet tube, and a reflux condenser was charged with 275 parts of deionized water, 421.2 parts of the reaction product (M-2) obtained in Production Example 2 (containing 400 parts of MAL-75 and 21.2 parts of polyethylene glycol), and 28.7 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.249 parts of hydrogen peroxide and 4.73 parts of deionized water was added thereto. Then, an aqueous solution prepared by dissolving 0.322 parts of L-ascorbic acid in 6.12 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give a Cement admixture (A-2) according to the present invention.

PRODUCTION EXAMPLE 10

Production of Cement Admixture (A-3)

A glass-made reaction vessel equipped with a thermometer, a stirrer, a dropping funnel, a nitrogen inlet tube, and a reflux condenser was charged with 273 parts of deionized water, 425.6 parts of the reaction product (M-3) obtained in Production Example 3 (containing 400 parts of MAL-100 and 25.6 parts of polyethylene glycol), and 21.8 parts of maleic acid, the reaction vessel inside was purged with nitrogen with stirring, and then contents were heated to 65° C. in a nitrogen atmosphere. Maintaining the temperature in the vessel at 65 C, an aqueous hydrogen peroxide solution composed of 0.189 parts of hydrogen peroxide and 3.59 parts of deionized water was added thereto. Then, an aqueous solution prepared by dissolving 0.245 parts of L-ascorbic acid in 4.65 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give a Cement admixture (A-3) according to the present invention.

PRODUCTION EXAMPLE 11

Production of Cement Admixture (A-4)

A glass-made reaction vessel equipped with a thermometer, a stirrer, a dropping funnel, a nitrogen inlet tube, and a reflux condenser was charged with 270 parts of deionized water, 448.0 parts of the reaction product (M-4) obtained in Production Example 4 (containing 400 parts of MAL-200 and 48.0 parts of polyethylene glycol), and 12.1 parts of maleic acid, the reaction vessel inside was purged with nitrogen with stirring, and then contents were heated to 65° C. in a nitrogen atmosphere. Maintaining the temperature in the vessel at 65° C., an aqueous hydrogen peroxide solution composed of 0.102 parts of hydrogen peroxide and 1.93 parts of deionized water was added thereto. Then, an aqueous solution prepared by dissolving 0.131 parts of L-ascorbic acid in 2.50 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give a Cement admixture (A-4) according to the present invention.

PRODUCTION EXAMPLE 12

Production of Cement Admixture (A-5)

A glass-made reaction vessel equipped with a thermometer, a stirrer, a dropping funnel, a nitrogen inlet tube, and a reflux condenser was charged with 275 parts of deionized water, 422.0 parts of the reaction product (M-5) obtained in Production Example 5 (containing 400 parts of MAL-70EO5PO and 22.0 parts of polyethylene polypropylene glycol), and 28.7 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.247 parts of hydrogen peroxide and 4.70 parts of deionized water was added thereto. Then, an aqueous solution prepared by dissolving 0.320 parts of L-ascorbic acid in 6.08 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give a Cement admixture (A-5) according to the present invention.

PRODUCTION EXAMPLE 13

Production of Cement Admixture (A-6)

A glass-made reaction vessel equipped with a thermometer, a stirrer, a dropping funnel, a nitrogen inlet tube, and a reflux condenser was charged with 280 parts of deionized water, 420.0 parts of the reaction product (M-1) obtained in Production Example 1 (containing 400 parts of MAL-50 and 20.0 parts of polyethylene glycol), and 34.1 parts of maleic acid, the reaction vessel inside was purged with nitrogen with stirring, and then were heated to 65° C. in a nitrogen atmosphere. Maintaining the temperature in the vessel at 65° C., an aqueous hydrogen peroxide solution composed of 0.490 parts of hydrogen peroxide and 9.31 parts of deionized water was added thereto. Then, 18.0 of acrylic acid was added dropwise to the reaction vessel over 3 hours, and at the same time, an aqueous solution prepared by dissolving 0.635 parts of L-ascorbic acid in 12.06 parts of deionized water was added dropwise over 3.5 hours. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give a Cement admixture (A-6) according to the present invention.

PRODUCTION EXAMPLE 14

Production of Cement Admixture (A-7)

A glass-made reaction vessel equipped with a thermometer, a stirrer, a dropping funnel, a nitrogen inlet tube, and a reflux condenser was charged with 284 parts of deionized water, 420.0 parts of the reaction product (M-1) obtained in Production Example 1 (containing 400 parts of MAL-50 and 20.0 parts of polyethylene glycol), and 42.7 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.439 parts of hydrogen peroxide and 8.34 parts of deionized water was added thereto. Then, 11.8 parts of 2-hydroxyethyl acrylate was added dropwise to the reaction vessel over 3 hours, and at the same time, an aqueous solution prepared by dissolving 0.568 parts of L-ascorbic acid in 10.79 parts of deionized water was added dropwise over 3.5 hours. Thereafter, the temperature was further maintained at 65° C. for 1 hour, and thereafter the polymerization reaction was finished. The polymerizable component concentration (% by mass concentration of all monomer components relative to all raw materials) was 60%. The reaction mixture was then neutralized to pH 7 with an aqueous solution of sodium hydroxide at a temperature not higher than the polymerization reaction temperature to give a Cement admixture (A-7) according to the present invention.

PRODUCTION EXAMPLE 15

Production of Cement Admixture (A-8)

A glass-made reaction vessel equipped with a thermometer, a stirrer, a dropping funnel, a nitrogen inlet tube, and a reflux condenser was charged with 126 parts of deionized water, 410.0 parts of the reaction product (M-6) obtained in Production Example 6 (containing 400 parts of AL-50 and 10.0 parts of polyethylene glycol), and 41.4 parts of maleic acid, the reaction vessel inside was purged with nitrogen with stirring, and then were heated to 65° C. in a nitrogen atmosphere. Maintaining the temperature in the vessel at 65° C., an aqueous hydrogen peroxide solution composed of 1.453 parts of hydrogen peroxide and 27.61 parts of deionized water was added thereto. Then, an aqueous solution prepared by dissolving 1.882 parts of L-ascorbic acid in 35.76 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give a Cement admixture (A-8) according to the present invention.

PRODUCTION EXAMPLE 16

Production of Cement Admixture (A-9)

A glass-made reaction vessel equipped with a thermometer, a stirrer, a dropping funnel, a nitrogen inlet tube, and a reflux condenser was charged with 140 parts of deionized water, 412.8 parts of the reaction product (M-7) obtained in Production Example 7 (containing 400 parts of AL-75 and 12.8 parts of polyethylene glycol), and 28.7 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 0.997 parts of hydrogen peroxide and 18.93 parts of deionized water was added thereto. Then, an aqueous solution prepared by dissolving 1.291 parts of L-ascorbic acid in 24.52 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give a Cement admixture (A-9) according to the present invention.

PRODUCTION EXAMPLE 17

Production of Cement Admixture (A-10)

A glass-made reaction vessel equipped with a thermometer, a stirrer, a dropping funnel, a nitrogen inlet tube, and a reflux condenser was charged with 108 parts of deionized water, 410.0 parts of the reaction product (M-6) obtained in Production Example 6 (containing 400 parts of AL-50 and 10.0 parts of polyethyleneglycol), and 34.1 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 1.963 parts of hydrogen peroxide and 37.29 parts of deionized water was added thereto. Then, 18.0 of acrylic acid was added dropwise to the reaction vessel over 3 hours, and at the same time, an aqueous solution prepared by dissolving 2.542 parts of L-ascorbic acid in 48.29 parts of deionized water was added dropwise over 3.5 hours. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give a Cement admixture (A-10) according to the present invention.

PRODUCTION EXAMPLE 18

Production of Cement Admixture (A-11)

A glass-made reaction vessel equipped with a thermometer, a stirrer, a dropping funnel, a nitrogen inlet tube, and a reflux condenser was charged with 118 parts of deionized water, 410.0 parts of the reaction product (M-6) obtained in Production Example 6 (containing 400 parts of AL-50 and 10.0 parts of polyethylene glycol), and 42.7 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 1.758 parts of hydrogen peroxide and 33.40 parts of deionized water was added thereto. Then, 11.8 parts of 2-hydroxyethyl acrylate was added dropwise to the reaction vessel over 3 hours, and at the same time, an aqueous solution prepared by dissolving 2.276 parts of L-ascorbic acid in 43.25 parts of deionized water was added dropwise over 3.5 hours. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give a Cement admixture (A-11) according to the present invention.

COMPARATIVE PRODUCTION EXAMPLE 1

Production of Comparative Cement Admixture (A'-1)

A glass-made reaction vessel equipped with a thermometer, a stirrer, a dropping funnel, a nitrogen inlet tube, and a reflux condenser was charged with 117 parts of deionized water, 400 parts of unsaturated polyalkylene glycol ether monomer (containing no polyalkylene glycol) derived from methallyl alcohol by addition of 10 moles, on average, of ethylene oxide, and 193.3 parts of maleic acid, the reaction vessel inside was purged with nitrogen with stirring, and then heated to 65° C. in a nitrogen atmosphere. Maintaining the temperature in the vessel at 65° C., an aqueous hydrogen peroxide solution composed of 6.658 parts of hydrogen peroxide and 59.93 parts of deionized water was added thereto. Then, an aqueous solution prepared by dissolving 8.623 parts of L-ascorbic acid in 77.61 parts of deionized water was added dropwise over 1 hour. Thereafter, the temperature was further maintained at 65° C. for 1 hour, and thereafter the polymerization reaction was finished. The polymerizable component concentration (% by mass concentration of all monomer components relative to all raw materials) was 70%. The reaction mixture was then neutralized to pH 7 with an aqueous solution of sodium hydroxide at a temperature not higher than the polymerization reaction temperature to give a Comparative cement admixture (A'-1).

COMPARATIVE PRODUCTION EXAMPLE 2

Production of Comparative Cement Admixture (A'-2)

A glass-made reaction vessel equipped with a thermometer, a stirrer, a dropping funnel, a nitrogen inlet tube, and a reflux condenser was charged with 1,575 parts of deionized water, the reaction vessel inside was purged with nitrogen with stirring, and then heated to 65° C. in a nitrogen atmosphere. Maintaining the temperature in the vessel at 65° C., an aqueous hydrogen peroxide solution composed of 1.237 parts of hydrogen peroxide and 23.51 parts of deionized water was added thereto. Then, 32.2 parts of maleic acid and a mixture prepared by mixing 100 parts of deionized water and 400 parts of unsaturated polyalkylene glycol ether monomer (containing no polyalkylene glycol) derived from allyl alcohol by addition of 50 moles, on average, of ethylene oxide were respectively added dropwise to the reaction vessel over 3 hours, and at the same time, an aqueous solution prepared by dissolving 1.603 parts of L-ascorbic acid in 30.45 parts of deionized water was added dropwise over 3.5 hours. Thereafter, the temperature was further maintained at 65° C. for 1 hour, and thereafter the polymerization reaction was finished. The polymerizable component concentration (% by mass concentration of all monomer components relative to all raw materials) was 20%. The reaction mixture was then neutralized to pH 7 with an aqueous solution of sodium hydroxide at a temperature not higher than the polymerization reaction temperature to give a Comparative cement admixture (A'-2).

COMPARATIVE PRODUCTION EXAMPLE 3

Preparation of Modified Product of Comparative Cement Admixture (A'-2)

Polyethylene glycol (weight-average molecular weight is 20000) was mixed with the reaction solution before neutralization obtained in the above Comparative production Example 2, and the mixing ratio (polyethylene glycol/the reaction solution) was 6.19 parts/100 parts. Then, the reaction mixture was then neutralized to pH 7 with an aqueous solution of sodium hydroxide to give a Comparative cement admixture (A'-2) added polyethylene glycol (as a matter of convenience, hereinafter referred to as Modified product of comparative cement admixture (A'-2))

COMPARATIVE PRODUCTION EXAMPLE 4

Production of Comparative Cement Admixture (A'-3)

A glass-made reaction vessel equipped with a thermometer, a stirrer, a dropping funnel, a nitrogen inlet tube, and a reflux condenser was charged with 40.1 parts of deionized water, 159.1 parts of unsaturated polyalkylene glycol ether monomer (containing no polyalkylene glycol) derived from methallyl alcohol by addition of 50 moles, on average, of ethylene oxide, and 10.2 parts of maleic acid, the reaction vessel inside was purged with nitrogen with stirring, and then heated to 65° C. in a nitrogen atmosphere. Maintaining the temperature in the vessel at 65° C., 0.7 parts of a 30% aqueous hydrogen peroxide solution was added thereto. Then, a mixture composed of 10.8 parts of acrylic acid and 19.2 parts of deionized water, and a mixture composed of 0.33 parts of 3-mercaptopropionic acid and 29.7 parts of deionized water were added dropwise to the reaction vessel over 3 hours respectively, and at the same time, an aqueous solution prepared by dissolving 0.3 parts of L-ascorbic acid in 29.7 parts of deionized water was added dropwise over 3.5 hours. Thereafter, the temperature was further maintained at 65° C. for 1 hour, and thereafter the polymerization reaction was finished. The reaction mixture was then neutralized to pH 7 with an aqueous solution of sodium hydroxide at a temperature not higher than the polymerization reaction temperature to give a Comparative cement admixture (A'-3), which is equivalent to Cement dispersant (1-2) according to Example 1-2 of European Patent publication No. 1179517.

COMPARATIVE PRODUCTION EXAMPLE 5

Production of Comparative Cement Admixture (A'-4)

A glass-made reaction vessel equipped with a thermometer, a stirrer, a dropping funnel, a nitrogen inlet tube, and a reflux condenser was charged with 35.2 parts of deionized water, 166.2 parts of unsaturated polyalkylene glycol ether monomer (containing no polyalkylene glycol) derived from methallyl alcohol by addition of 75 moles, on average, of ethylene oxide, and 6.7 parts of maleic acid, the reaction vessel inside was purged with nitrogen with stirring, and then heated to 80° C. in a nitrogen atmosphere. Maintaining the temperature in the vessel at 80° C., 1.9 parts of a 30% aqueous hydrogen peroxide solution was added thereto. Then, a mixture composed of 7.1 parts of acrylic acid and 22.9 parts of deionized water, and a mixture composed of 0.11 parts of 3-mercapto propionic acid and 29.9 parts of deionized water were added dropwise to the reaction vessel over 3 hours respectively, and at the same time, an aqueous solution prepared by dissolving 0.7 parts of L-ascorbic acid in 29.3 parts of deionized water was added dropwise over 3.5 hours. Thereafter, the temperature was further maintained at 80° C. for 1 hour, and thereafter the polymerization reaction was finished. The reaction mixture was then neutralized to pH 7 with an aqueous solution of sodium hydroxide at a temperature not higher than the polymerization reaction temperature to give a Comparative cement admixture (A'-4), which is equivalent to Cement dispersant (3-3) according to Example 3-3 of European Patent publication No. 1179517.

COMPARATIVE PRODUCTION EXAMPLE 6

Production of Comparative Cement Admixture (A'-5)

A glass-made reaction vessel equipped with a thermometer, a stirrer, a dropping funnel, a nitrogen inlet tube, and a reflux condenser was charged with 168 parts of deionized water, 412.8 parts of the reaction product (M-7) obtained in Production Example 7 (containing 400 parts of AL-75 and 12.8 parts of polyethylene glycol), the reaction vessel inside was purged with nitrogen with stirring, and then heated to 80° C. in a nitrogen atmosphere. Maintaining the temperature in the vessel at 80° C., an aqueous hydrogen peroxide solution composed of 1.977 parts of hydrogen peroxide and 7.91 parts of deionized water was added thereto. Then, a mixture composed of 43.8 parts of acrylic acid was added dropwise to the reaction vessel over 3 hours, and at the same time, an aqueous solution prepared by dissolving 2.561 parts of L-ascorbic acid and 0.772 parts of 3-mercaptopropionic acid in 14.51 parts of deionized water was added dropwise over 3.5 hours. Thereafter, the temperature was further maintained at 80° C. for 1 hour, and thereafter the polymerization reaction was finished. The reaction mixture was then neutralized to pH 7 with an aqueous solution of sodium hydroxide at a temperature not higher than the polymerization reaction temperature to give a Comparative cement admixture (A'-5), which is equivalent to Polymer (A-11) according to Production Example 29 of WO02/096823.

In each Production Example, the conversion (%) of each starting monomer, and analysis result of the copolymer contained in Cement admixture obtained, namely the composition ratio of copolymer (% by mass), amount of the constituent unit derived from unsaturated polyalkylene glycol ether monomer (monomer (a)) (mole %), the carboxylic acid content (meq/g) on the basis of the unneutralized copolymer, weight-average molecular weight, the content of unsaturated polyalkylene glycol ether monomer (monomer (a)) relative to the neutralized copolymer (% by mass), and the content of non-polymerizable polyalkylene glycol (B) having no alkenyl group relative to the neutralized copolymer (% by mass) are shown in Table 2.

TABLE 2

| | Cement admixture | Conversion (%) of each starting monomer AO monomer/MA/other | Composition ratio of copolymer (% by mass) AO monomer/MA/other | Amount of constituent unit derived from AO monomer (mole %) | Carboxylic acid content (meq/g) on the basis of unneutralized copolymer | Weight average molecular weight | AO monomer content (%)*1 | Polyalkylene glycol content (%)*2 |
|---|---|---|---|---|---|---|---|---|
| Production Ex. 8 | Cement admixture (A-1) | 89.2/87.2/0.0 | 90.8/9.2/0.0 | 33.5 | 1.59 | 30500 | 10.6 | 4.9 |
| Production Ex. 9 | Cement admixture (A-2) | 86.5/83.3/0.0 | 93.5/6.5/0.0 | 33.3 | 1.11 | 31000 | 14.3 | 5.6 |
| Production Ex. 10 | Cement admixture (A-3) | 80.7/77.0/0.0 | 95.1/4.9/0.0 | 33.3 | 0.85 | 34800 | 22.3 | 7.4 |
| Production Ex. 11 | Cement admixture (A-4) | 71.5/61.2/0.0 | 97.5/2.5/0.0 | 33.6 | 0.44 | 58500 | 38.5 | 16.2 |
| Production Ex. 12 | Cement admixture (A-5) | 74.6/71.0/0.0 | 93.6/6.4/0.0 | 33.1 | 1.10 | 29500 | 31.1 | 6.7 |
| Production Ex. 13 | Cement admixture (A-6) | 91.5/92.5/AA 99.0 | 88.1/7.6/AA 4.3 | 23.7 | 1.91 | 32000 | 7.9 | 4.6 |
| Production Ex. 14 | Cement admixture (A-7) | 90.2/90.5/HEA 98.0 | 87.8/9.4/HEA 2.8 | 26.9 | 1.62 | 31500 | 9.2 | 4.7 |
| Production Ex. 15 | Cement admixture (A-8) | 65.0/64.5/0.0 | 90.7/9.3/0.0 | 33.3 | 1.61 | 22000 | 47.2 | 3.4 |
| Production Ex. 16 | Cement admixture (A-9) | 61.0/59.0/0.0 | 93.5/6.5/0.0 | 33.3 | 1.12 | 23500 | 58.4 | 4.8 |
| Production Ex. 17 | Cement admixture (A-10) | 68.5/67.7/AA 98.5 | 87.0/7.3/AA 5.7 | 21.4 | 2.05 | 25300 | 38.3 | 3.0 |
| Production Ex. 18 | Cement admixture (A-11) | 67.0/66.0/HEA 97.5 | 87.1/9.2/HEA 3.7 | 25.8 | 1.58 | 24000 | 41.5 | 3.1 |
| Comparative Production Ex. 1 | Comparative cement admixture (A'-1) | 99.0/96.0/0.0 | 60.7/39.3/0.0 | 32.6 | 5.50 | 21000 | 0.6 | 0.0 |
| Comparative Production Ex. 2 | Comparative cement admixture (A'-2) | 43.0/55.0/0.0 | 87.6/12.4/0.0 | 33.3 | 1.61 | 9700 | 116.1 | 0.0 |
| Comparative Production Ex. 3 | Modified product of comparative cement admixture (A'-2) | 43.0/55.0/0.0 | 87.6/12.4/0.0 | 33.3 | 1.61 | 9700 | 116.1 | 70.0 |
| Comparative Production Ex. 4 | Comparative cement admixture (A'-3) | 90.0/83.0/AA 99.0 | 88.2/5.2/AA 6.6 | 22.2 | 1.81 | 28000 | 9.4 | 0.0 |
| Comparative Production Ex. 5 | Comparative cement admixture (A'-4) | 55.0/68.0/AA 97.0 | 88.9/4.4/AA 6.7 | 16.8 | 1.69 | 25500 | 70.1 | 0.0 |

TABLE 2-continued

| | Cement admixture | Conversion (%) of each starting monomer AO monomer/MA/other | Composition ratio of copolymer (% by mass) AO monomer/MA/other | Amount of constituent unit derived from AO monomer (mole %) | Carboxylic acid content (meq/g) on the basis of unneutralized copolymer | Weight average molecular weight | AO monomer content (%)*1 | Polyalkylene glycol content (%)*2 |
|---|---|---|---|---|---|---|---|---|
| Comparative Production Ex. 6 | Comparative cement admixture (A'-5) | 63.3/0.0/AA 97.0 | 85.6/0.0/AA 14.4 | 11.3 | 1.99 | 36500 | 47.6 | 4.2 | note:
Each of "*1" and "*2" means the content (% by mass) of each compound relative to the neutralized copolymer.

The descriptions in Table 2 are as follows.
AO monomer: the unsaturated (poly)alkylene glycol ether monomer (a)
MA: maleic acid
AA: acrylic acid
HEA: 2-hydroxyethyl acrylate

EXAMPLES 1 TO 11 AND COMPARATIVE EXAMPLES 1 TO 6

Concrete compositions were prepared by using Cement admixture (A-1) to (A-11) according to the present invention, Comparative cement admixture (A'-1), (A'-2), Modified product of comparative cement admixture (A'-2), and (A'-3) to (A'-5), obtained as mentioned above, and then change in the slump flow value by time, spreading speed, and air content were measured by the following methods. In addition, in order to make temperature of the concrete composition to test temperature, 20° C., the temperature of raw materials, the revolving-puddle mixer and the measurement equipments used for the test were controlled under the test temperature atmosphere, and mixing and each measurement were performed at the test temperature atmosphere. Results are shown in Table 3.

Each concrete composition was prepared as follows. At first, 658 kg/m³ of a fine aggregate (land sand originated in Ohigawa river sand) was mixed for 10 seconds by a forced pan type mixer of 50 L capacity and, then, 580 kg/m³ of cement (produced by Taiheiyo Cement, ordinaly portland cement) was added and mixed again for 10 seconds. After that, 174 kg/m³ of tap water containing a cement admixture in a proper amount to adjust the initial slump flow value to be 600±50 mm was added and mixed for 150 seconds. Then, 895 kg/m³ of a coarse aggregate (crushed stone originated in Oume) was added, and mixing was further performed for 90 seconds to produce each concrete composition. For avoiding the possible influence of bubbles in the concrete composition on the fluidity of the concrete composition, the air content was adjusted to 2.0±0.5% by volume using a commercial oxyalkylene antifoaming agent. In addition, the ratio of water/cement (by mass) was 0.30, the proportion of the fine aggregate (the fine aggregate/(the fine aggregate+the coarse aggregate)) (by volume) was 0.424.

The amount used of each cement admixture (% by mass) relative to cement (the amount of solid content [nonvolatile component] in cement admixture relative to cement), the amount of each copolymer (A) (or comparative copolymer (A')) (% by mass) in cement admixture relative to the cement, the amount of each unsaturated polyalkylene glycol ether monomer (a) (% by mass) relative to the cement, and the amount of each non-polymerizable polyalkylene glycol (B) having no alkenyl group (% by mass) relative to the cement are shown in Table 3. Further, the solid content [nonvolatile component] in each cement admixture was measured by drying an appropriate amount of the cement admixture by heating at 130° C. to remove the volatile matter, and an amount of the admixture was weighed and incorporated in cement so that a predetermined amount of the solid matter component [nonvolatile component] might be contained in the formulation.

Item of the evaluation test and measuring method thereof are as follows. Results are shown in Table 3.

1) Change of the slump flow value with the lapse of time: Measured according to JIS (Japanese Industrial Standards)-A-1101

2) Spreading speed (Test for evaluating effect on viscosity decrease of concrete composition): At the time of measuring the initial slump flow value, the time taken until the flow value reached 500 mm from the time when the slump cone was pulled, and the time was defined as the spreading speed (second). The shorter the time was, the more excellent the viscosity decreasing effect in high share condition was.

3) Air content: Measured according to JIS-A-1128

TABLE 3

| | Addreviation | Amount used of cement admixture (% by mass)/ cement | Amount of copolymer (A) or (A') (% by mass)/ cement | Amount of monomer (a) (% by mass)/ cement | Amount of polyalkylene glycol (B) (% by mass)/ cement | Slump flow value (mm) After 5 min | After 60 min | After 90 min | Spreading speed (sec) | Air content (% by volume) |
|---|---|---|---|---|---|---|---|---|---|---|
| Example 1 | Cement admixture (A-1) | 0.210 | 0.1818 | 0.0193 | 0.0089 | 645 | 530 | 400 | 11.4 | 1.9 |
| Example 2 | Cement admixture (A-2) | 0.200 | 0.1669 | 0.0238 | 0.0093 | 630 | 522 | 405 | 10.3 | 1.7 |
| Example 3 | Cement admixture (A-3) | 0.220 | 0.1696 | 0.0378 | 0.0125 | 610 | 525 | 433 | 9.8 | 2.0 |
| Example 4 | Cement admixture (A-4) | 0.280 | 0.1810 | 0.0697 | 0.0293 | 580 | 527 | 470 | 9.0 | 2.2 |
| Example 5 | Cement admixture (A-5) | 0.230 | 0.1668 | 0.0519 | 0.0112 | 620 | 535 | 438 | 9.2 | 1.8 |
| Example 6 | Cement admixture (A-6) | 0.200 | 0.1778 | 0.0140 | 0.0082 | 635 | 525 | 410 | 10.8 | 2.3 |

TABLE 3-continued

|  | Addreviation | Amount used of cement admixture (% by mass)/ cement | Amount of copolymer (A) or (A') (% by mass)/ cement | Amount of monomer (a) (% by mass)/ cement | Amount of polyalkylene glycol (B) (% by mass)/ cement | Slump flow value (mm) | | | Spreading speed (sec) | Air content (% by volume) |
|---|---|---|---|---|---|---|---|---|---|---|
|  |  |  |  |  |  | After 5 min | After 60 min | After 90 min |  |  |
| Example 7 | Cement admixture (A-7) | 0.210 | 0.1844 | 0.0170 | 0.0087 | 605 | 515 | 400 | 11.1 | 2.2 |
| Example 8 | Cement admixture (A-8) | 0.280 | 0.1860 | 0.0877 | 0.0063 | 625 | 510 | 390 | 8.5 | 1.8 |
| Example 9 | Cement admixture (A-9) | 0.270 | 0.1655 | 0.0966 | 0.0079 | 630 | 527 | 420 | 8.2 | 2.3 |
| Example 10 | Cement admixture (A-10) | 0.260 | 0.1840 | 0.0704 | 0.0056 | 635 | 530 | 405 | 9.8 | 2.1 |
| Example 11 | Cement admixture (A-11) | 0.270 | 0.1867 | 0.0774 | 0.0059 | 610 | 505 | 395 | 9.4 | 1.9 |
| Comparative Ex. 1 | Comparative cement admixture (A'-1) | 0.220 | 0.2187 | 0.0013 | 0.0000 | 615 | 210 | 200 | 20.5 | 2.3 |
| Comparative Ex. 2 | Comparative cement admixture (A'-2) | 0.530 | 0.2453 | 0.2847 | 0.0000 | 630 | 470 | 295 | 15.3 | 1.9 |
| Comparative Ex. 3 | Modified product of comparative cement admixture (A'-2) | 0.700 | 0.2447 | 0.2840 | 0.1713 | 625 | 480 | 315 | 14.2 | 2.1 |
| Comparative Ex. 4 | Comparative cement admixture (A'-3) | 0.200 | 0.1828 | 0.0172 | 0.0000 | 620 | 500 | 370 | 14.8 | 2.0 |
| Comparative Ex. 5 | Comparative cement admixture (A'-4) | 0.300 | 0.1763 | 0.1237 | 0.0000 | 615 | 490 | 355 | 14.1 | 2.1 |
| Comparative Ex. 6 | Comparative cement admixture (A'-5) | 0.280 | 0.1846 | 0.0878 | 0.0077 | 605 | 470 | 340 | 15.2 | 1.8 |

From the results of Table 3, in the case of Comparative Example 1 using Comparative cement admixture (A'-1) (the content of the unsaturated polyalkylene glycol ether monomer (a) was too small and no polyalkylene glycol (B) was added), it was found that the change of the slump flow value by time was considerably large and the spreading speed was significantly slow. Meanwhile, in the case of Comparative Example 2 using Comparative cement admixture (A'-2) (the content of the unsaturated polyalkylene glycol ether monomer (a) was too high and no polyalkylene glycol (B) was added), and Comparative Example 3 using Modified product of (A'-2) (the contents of both of the unsaturated polyalkylene glycol ether monomer (a) and the polyalkylene glycol (B) were too high), it was found that the addition amount was high to obtain a prescribed slump flow value and the slump flow value was remarkably changed with the lapse of time and the spreading speed was slow. Further, in any case of Comparative Example 4 using Comparative cement admixture (A'-3), which is equivalent to Cement dispersant (1-2) according to Example 1-2 of European Patent publication No. 1179517, Comparative Example 5 using Comparative cement admixture (A'-4), which is equivalent to Cement dispersant (3-3) according to Example 3-3 of European Patent publication No. 1179517, and Comparative Example 6 using Comparative cement admixture (A'-5), which is equivalent to Polymer (A-11) according to Production Example 29 of WO02/096823, it was found that the slump flow value was remarkably changed with the lapse of time and the spreading speed was slow.

On the other hand, in the case of Example 1 to 11 using the cement admixtures (A-1) to (A-11) of the present invention, it was found that all of the cement admixtures showed high dispersing ability with small amount addition and the change of the slump flow value with the lapse of time was slight and the spreading speed was high; therefore, decrease of the fluidity of concrete compositions was slight and the viscosity decreasing effect under high share condition was excellent.

EXAMPLES 12 TO 23 AND COMPARATIVE EXAMPLES 7 TO 11

The following compounds were used as the setting accelerator (C1).
(C1-1) calcium nitrite
(C1-2) calcium chloride Concrete compositions were prepared by the same manner as Example 1, using Ordinary Portland cement (product of Taiheiyo Cement) as cement, Ohigawa river sand as fine aggregate, Oume crushed stone as coarse aggregate, and tap water as mixing water. In addition, in order to make the temperature of the concrete composition to test temperature, 15° C., the temperature of raw materials, the revolving-puddle mixer and the measurement equipments used for the test were controlled under the test temperature atmosphere, and mixing and each measurement were performed at the test temperature atmosphere.

The amount of each copolymer (A) (or comparative copolymer (A')) (% by mass) in cement admixture relative to the cement, the amount of each unsaturated polyalkylene glycol ether monomer (a) (% by mass) relative to the cement, non-polymerizable polyalkylene glycol (B) having no alkenyl group (% by mass) relative to the cement, the amount of the setting accelerator (C1) (% by mass) relative to the cement, the total amount (% by mass) as cement admixture relative to the cement, and the amount of the setting accelerator (C1) (% by mass) relative to the copolymer (A) (or comparative copolymer (A')) are shown in Table 4.

Items of the evaluation test and measuring methods thereof are as follows. Results are shown in Table 4.

1) Change of the slump flow value with the lapse of time: Measured in the same manner as Example 1

2) Spreading speed (Test for evaluating effect on viscosity decrease of concrete composition): Measured in the same manner as Example 1

3) Air content: Measured in the same manner as Example 1

4) Setting time (final setting time): Measured according to Accompanying document I of JIS-A-6204

TABLE 4

| Cement admixture | | Amount of copolymer (A) or (A') (% by mass)/cement | Amount of mono-mer (a) (% by mass)/cement | Amount of polyalkylene glycol (B) (% by mass)/cement | Amount of Setting accelerator (C1) (% by mass)/cement | Total amount (% by mass) as cement admixture/cement | Amount of Setting accelerator (C1) (% by mass)/copolymer (A) or (A') | Slump flow value (mm) | | | Spread-ing speed (sec) | Setting time (final setting time) (min) |
|---|---|---|---|---|---|---|---|---|---|---|---|---|
| | Addreviation | Setting accel-erator (C1) | | | | | | | After 5 min | After 60 min | After 90 min | | |
| Example 12 | Cement admixture (A-1) | C1-1 | 0.1818 | 0.0193 | 0.0089 | 0.500 | 0.710 | 275 | 640 | 520 | 390 | 11.5 | 390 |
| Example 13 | Cement admixture (A-1) | C1-1 | 0.1818 | 0.0193 | 0.0089 | 1.000 | 1.210 | 550 | 630 | 510 | 380 | 11.7 | 330 |
| Example 14 | Cement admixture (A-2) | C1-1 | 0.1669 | 0.0238 | 0.0093 | 0.500 | 0.700 | 300 | 620 | 515 | 395 | 10.5 | 360 |
| Example 15 | Cement admixture (A-3) | C1-1 | 0.1696 | 0.0378 | 0.0125 | 0.500 | 0.720 | 295 | 605 | 520 | 425 | 10.0 | 320 |
| Example 16 | Cement admixture (A-4) | C1-2 | 0.1810 | 0.0697 | 0.0293 | 0.700 | 0.980 | 387 | 575 | 525 | 465 | 9.3 | 300 |
| Example 17 | Cement admixture (A-5) | C1-1 | 0.1668 | 0.0519 | 0.0112 | 0.500 | 0.730 | 300 | 610 | 525 | 425 | 9.4 | 370 |
| Example 18 | Cement admixture (A-6) | C1-1 | 0.1778 | 0.0140 | 0.0082 | 1.000 | 1.200 | 562 | 630 | 520 | 395 | 11.0 | 350 |
| Example 19 | Cement admixture (A-7) | C1-1 | 0.1844 | 0.0170 | 0.0087 | 0.500 | 0.710 | 271 | 600 | 510 | 390 | 11.3 | 380 |
| Example 20 | Cement admixture (A-8) | C1-1 | 0.1860 | 0.0877 | 0.0063 | 0.500 | 0.780 | 269 | 615 | 505 | 380 | 8.7 | 380 |
| Example 21 | Cement admixture (A-9) | C1-2 | 0.1655 | 0.0966 | 0.0079 | 0.700 | 0.970 | 423 | 620 | 515 | 400 | 8.4 | 370 |
| Example 22 | Cement admixture (A-10) | C1-2 | 0.1840 | 0.0704 | 0.0056 | 1.000 | 1.260 | 544 | 625 | 520 | 395 | 10.0 | 360 |
| Example 23 | Cement admixture (A-11) | C1-1 | 0.1867 | 0.0774 | 0.0059 | 0.500 | 0.770 | 268 | 600 | 500 | 385 | 9.7 | 350 |
| Comparative Ex. 7 | Comparative cement admixture (A'-1) | C1-2 | 0.2187 | 0.0013 | 0.0000 | 0.700 | 0.920 | 320 | 610 | 230 | 205 | 20.7 | 530 |
| Comparative Ex. 8 | Comparative cement admixture (A'-2) | C1-2 | 0.2453 | 0.2847 | 0.0000 | 0.700 | 1.230 | 285 | 620 | 460 | 285 | 15.5 | 460 |
| Comparative Ex. 9 | Modified product of comparative cement admixture (A'-2) | C1-2 | 0.2447 | 0.2840 | 0.1713 | 0.700 | 1.400 | 286 | 615 | 470 | 300 | 14.5 | 480 |
| Comparative Ex. 10 | Cement admixture (A-6) | — | 0.1778 | 0.0140 | 0.0082 | 0.000 | 0.200 | 0 | 625 | 520 | 410 | 11.1 | 750 |
| Comparative Ex. 11 | Cement admixture (A-10) | — | 0.1840 | 0.0704 | 0.0056 | 0.000 | 0.260 | 0 | 625 | 520 | 405 | 10.2 | 770 |

From the results of Table 4, in the case of Comparative Example 7 using Comparative cement admixture (A'-1) (the content of the unsaturated polyalkylene glycol ether monomer (a) was too small and no polyalkylene glycol (B) was added), it was found that the change of the slump flow value with the lapse of time was considerably large and the spreading speed was significantly slow. Meanwhile, in the case of Comparative Example 8 using Comparative cement admixture (A'-2) (the content of the unsaturated polyalkylene glycol ether monomer (a) was too high and no polyalkylene glycol (B) was added), and Comparative Example 9 using Modified product of (A'-2) (the contents of both of the unsaturated polyalkylene glycol ether monomer (a) and the polyalkylene glycol (B) were too high), it was found that the addition amount was high to obtain a prescribed slump flow value and the slump flow value was remarkably changed with the lapse of time and the spreading speed was slow. Further, in the case of Comparative Example 10 using Cement admixture (A-6) without using the setting accelerator (C1) in combination, and Comparative Example 11 using Cement admixture (A-10) without using the setting accelerator (C1) in combination, it was found that although the change of the slump flow value by time was slight and the spreading speed was high, the setting was significantly slow.

On the other hand, in the case of Example 12 to 23 using the cement admixtures of the present invention containing the setting accelerator (C1), it was found that the change of the slump flow value by time was slight and the spreading speed was high, and further the setting was fast.

EXAMPLES 24 TO 47 AND COMPARATIVE EXAMPLES 12 TO 20

The following compounds were used as at least one compound (C2) selected from oxycarboxylic acid, its salt, saccharide, and sugar alcohol or an inorganic setting retarder (K).
(C2-1) sodium gluconate
(C2-2) malic acid
(C2-3) glucose
(C2-4) sorbitol
(K-1) dipotassium hydrogenphosphate Concrete compositions were prepared by the same manner as Example 1, using Ordinary Portland cement (product of Taiheiyo Cement) as cement, Ohigawa river sand as fine aggregate, Oume crushed stone as coarse aggregate, and tap water as mixing water. In addition, in order to make the temperature of the concrete composition to test temperature, 15° C. or 30° C., the temperature of raw materials, the revolving-puddle mixer and the measurement equipments used for the test were controlled under the test temperature atmosphere, and mixing and each measurement were performed at the test temperature atmosphere.

The amount of each copolymer (A) (or comparative copolymer (A')) in cement admixture relative to the cement (% by mass), the amount of each unsaturated polyalkylene glycol ether monomer (a) relative to the cement (% by mass), non-polymerizable polyalkylene glycol (B) having no alkenyl group relative to the cement (% by mass), the amount of each at least one compound (C2) selected from oxycarboxylic acid, its salt, saccharide, and sugar alcohol or inorganic setting retarder (K) relative to the cement (% by mass), the total amount as cement admixture relative to the cement (% by mass), and the amount of each at least one compound (C2) selected from oxycarboxylic acid, its salt, saccharide, and sugar alcohol or inorganic setting retarder (K) relative to the copolymer (A) (or comparative copolymer (A')) (% by mass) are shown in Table 5.

Items of the evaluation test and measuring methods thereof are as follows. Results are shown in Table 5.

1) Change of the slump flow value by time: Measured in the same manner as Example 1

2) Spreading speed (Test for evaluating effect on viscosity decrease of concrete composition): Measured in the same manner as Example 1

3) Air content: Measured in the same manner as Example 1

4) Setting time (final setting time): Measured according to Accompanying document I of JIS-A-6204.

TABLE 5

| | Test temprature (° C.) | Cement admixture Addreviation | Compound (C2) or Setting retarder (K) | Amount of copolymer (A) or (A') (% by mass)/ cement | Amount of monomer (a) (% by mass)/ cement | Amount of polyalkylene glycol (B) (% by mass)/ cement |
|---|---|---|---|---|---|---|
| Example 24 | 30 | Cement admixture (A-1) | C2-1 | 0.1558 | 0.0166 | 0.0077 |
| Example 25 | 30 | Cement admixture (A-1) | C2-1 | 0.1558 | 0.0166 | 0.0077 |
| Example 26 | 30 | Cement admixture (A-2) | C2-2 | 0.1419 | 0.0202 | 0.0079 |
| Example 27 | 30 | Cement admixture (A-3) | C2-3 | 0.1465 | 0.0327 | 0.0108 |
| Example 28 | 30 | Cement admixture (A-4) | C2-4 | 0.1551 | 0.0597 | 0.0251 |
| Example 29 | 30 | Cement admixture (A-5) | C2-1 | 0.1451 | 0.0451 | 0.0098 |
| Example 30 | 30 | Cement admixture (A-6) | C2-1 | 0.1511 | 0.0119 | 0.0070 |
| Example 31 | 30 | Cement admixture (A-7) | C2-1 | 0.1580 | 0.0146 | 0.0074 |
| Example 32 | 30 | Cement admixture (A-8) | C2-1 | 0.1594 | 0.0752 | 0.0054 |
| Example 33 | 30 | Cement admixture (A-9) | C2-2 | 0.1410 | 0.0823 | 0.0068 |
| Example 34 | 30 | Cement admixture (A-10) | C2-2 | 0.1557 | 0.0596 | 0.0047 |
| Example 35 | 30 | Cement admixture (A-11) | C2-1 | 0.1590 | 0.0660 | 0.0050 |
| Example 36 | 15 | Cement admixture (A-1) | C2-1 | 0.1558 | 0.0166 | 0.0077 |
| Example 37 | 15 | Cement admixture (A-1) | C2-1 | 0.1558 | 0.0166 | 0.0077 |
| Example 38 | 15 | Cement admixture (A-2) | C2-2 | 0.1419 | 0.0202 | 0.0079 |
| Example 39 | 15 | Cement admixture (A-3) | C2-3 | 0.1465 | 0.0327 | 0.0108 |
| Example 40 | 15 | Cement admixture (A-4) | C2-4 | 0.1551 | 0.0597 | 0.0251 |
| Example 41 | 15 | Cement admixture (A-5) | C2-1 | 0.1451 | 0.0451 | 0.0098 |
| Example 42 | 15 | Cement admixture (A-6) | C2-1 | 0.1511 | 0.0119 | 0.0070 |
| Example 43 | 15 | Cement admixture (A-7) | C2-1 | 0.1580 | 0.0146 | 0.0074 |
| Example 44 | 15 | Cement admixture (A-8) | C2-1 | 0.1594 | 0.0752 | 0.0054 |
| Example 45 | 15 | Cement admixture (A-9) | C2-2 | 0.1410 | 0.0823 | 0.0068 |
| Example 46 | 15 | Cement admixture (A-10) | C2-2 | 0.1557 | 0.0596 | 0.0047 |
| Example 47 | 15 | Cement admixture (A-11) | C2-1 | 0.1590 | 0.0660 | 0.0050 |
| Comparative Ex. 12 | 30 | Comparative cement admixture (A'-1) | C2-2 | 0.2087 | 0.0013 | 0.0000 |
| Comparative Ex. 13 | 30 | Comparative cement admixture (A'-2) | C2-2 | 0.2360 | 0.2740 | 0.0000 |
| Comparative Ex. 14 | 30 | Modified product of comparative cement admixture (A'-2) | C2-2 | 0.2377 | 0.2759 | 0.1664 |
| Comparative Ex. 15 | 30 | Cement admixture (A-10) | — | 0.1840 | 0.0704 | 0.0056 |
| Comparative Ex. 16 | 30 | — | C2-1 | 0.0000 | 0.0000 | 0.0000 |
| Comparative Ex. 17 | 30 | — | C2-2 | 0.0000 | 0.0000 | 0.0000 |
| Comparative Ex. 18 | 30 | — | C2-3 | 0.0000 | 0.0000 | 0.0000 |
| Comparative Ex. 19 | 30 | — | C2-4 | 0.0000 | 0.0000 | 0.0000 |
| Comparative Ex. 20 | 30 | Cement admixture (A-10) | K-1 | 0.2312 | 0.0182 | 0.0107 |

TABLE 5-continued

|  | Amount of compound (C2) or (K) (% by mass)/ cement | Total amount (% by mass) as cement admixture/ cement | Amount of compound (C2) or (K) (% by mass)/ copolymer (A) or (A') | Slump flow value (mm) | | | Spreading speed (sec) | Setting time (final setting time × min) |
| --- | --- | --- | --- | --- | --- | --- | --- | --- |
|  |  |  |  | After 5 min | After 60 min | After 90 min |  |  |
| Example 24 | 0.020 | 0.200 | 13 | 630 | 540 | 440 | 11.6 | 370 |
| Example 25 | 0.050 | 0.230 | 32 | 645 | 580 | 510 | 11.3 | 430 |
| Example 26 | 0.050 | 0.220 | 35 | 630 | 565 | 500 | 10.5 | 400 |
| Example 27 | 0.070 | 0.260 | 48 | 615 | 560 | 500 | 10.0 | 390 |
| Example 28 | 0.100 | 0.340 | 64 | 580 | 535 | 490 | 9.2 | 380 |
| Example 29 | 0.050 | 0.250 | 34 | 620 | 560 | 495 | 9.5 | 395 |
| Example 30 | 0.050 | 0.220 | 33 | 630 | 560 | 480 | 11.0 | 420 |
| Example 31 | 0.050 | 0.230 | 32 | 610 | 560 | 490 | 11.2 | 410 |
| Example 32 | 0.050 | 0.290 | 31 | 630 | 560 | 480 | 8.8 | 400 |
| Example 33 | 0.050 | 0.280 | 35 | 635 | 570 | 495 | 8.5 | 390 |
| Example 34 | 0.040 | 0.260 | 26 | 640 | 565 | 480 | 10.1 | 430 |
| Example 35 | 0.050 | 0.280 | 31 | 620 | 560 | 480 | 9.8 | 410 |
| Example 36 | 0.020 | 0.200 | 13 | 620 | 595 | 570 | 12.0 | 725 |
| Example 37 | 0.040 | 0.220 | 26 | 635 | 620 | 605 | 11.7 | 805 |
| Example 38 | 0.040 | 0.210 | 28 | 640 | 630 | 615 | 11.0 | 790 |
| Example 39 | 0.060 | 0.250 | 41 | 625 | 615 | 605 | 10.5 | 780 |
| Example 40 | 0.080 | 0.320 | 52 | 595 | 585 | 575 | 9.6 | 765 |
| Example 41 | 0.040 | 0.240 | 28 | 630 | 615 | 595 | 9.8 | 785 |
| Example 42 | 0.040 | 0.210 | 26 | 640 | 620 | 590 | 11.3 | 815 |
| Example 43 | 0.040 | 0.220 | 25 | 620 | 615 | 595 | 11.5 | 800 |
| Example 44 | 0.040 | 0.280 | 25 | 625 | 605 | 580 | 9.2 | 800 |
| Example 45 | 0.040 | 0.270 | 28 | 620 | 605 | 585 | 9.0 | 790 |
| Example 46 | 0.030 | 0.250 | 19 | 630 | 610 | 580 | 10.5 | 825 |
| Example 47 | 0.040 | 0.270 | 25 | 610 | 600 | 575 | 10.3 | 805 |
| Comparative Ex. 12 | 0.050 | 0.260 | 24 | 610 | 280 | 250 | 20.0 | 520 |
| Comparative Ex. 13 | 0.050 | 0.560 | 21 | 620 | 480 | 310 | 15.8 | 430 |
| Comparative Ex. 14 | 0.050 | 0.730 | 21 | 615 | 500 | 350 | 14.7 | 470 |
| Comparative Ex. 15 | 0.000 | 0.260 | 0 | 620 | 460 | 270 | 10.3 | 330 |
| Comparative Ex. 16 | 1.000 | 1.000 | — | 250 | — | — | — | After 24 hours Non curing |
| Comparative Ex. 17 | 1.000 | 1.000 | — | 220 | — | — | — | After 24 hours Non curing |
| Comparative Ex. 18 | 1.000 | 1.000 | — | 220 | — | — | — | After 24 hours Non curing |
| Comparative Ex. 19 | 1.000 | 1.000 | — | 210 | — | — | — | After 24 hours Non curing |
| Comparative Ex. 20 | 0.080 | 0.340 | 35 | 615 | 495 | 320 | 10.5 | 400 |

In Table 5, with the column of slump flow value, "-" means the change of the slump flow value by time was not measured because sufficient flow values were not obtained since the fluidity of the concrete of 5 minutes after was too low. On the other hand, with the column of the spreading speed, "-" means that the spreading speed was not measured because sufficient flow values were not obtained.

From the results shown in Table 5, at the test temperature atmosphere of 30° C., in the case of Comparative Example 12 using Comparative cement admixture (A'-1) (the content of the unsaturated polyalkylene glycol ether monomer (a) was too small and no polyalkylene glycol (B) was added), it was found that the change of the slump flow value by time was considerably large and the spreading speed was significantly slow. Similarly, in the case of Comparative Example 13 using Comparative cement admixture (A'-2) (the content of the unsaturated polyalkylene glycol ether monomer (a) was too high and no polyalkylene glycol (B) was added), and Comparative Example 14 using Modified product of (A'-2) (the contents of both of the unsaturated polyalkylene glycol ether monomer (a) and the polyalkylene glycol (B) were too high), it was found that the slump flow value was remarkably changed with the lapse of time and the spreading speed was slow. Further, in the case of Comparative Example 15 using Cement admixture (A-10) without using the above compound (C2-2) in combination, and Comparative Example 20 using Cement admixture (A-10) and inorganic setting retarder (K-1), it was found that although the spreading speed was high and the setting was fast, the change of the slump flow value by time was large. Meanwhile, in the case of Comparative Examples 16 to 19 respectively using at least one compound (C2-1), (C2-2), (C2-3) or (C2-4) selected from oxycarboxylic acid, its salt, saccharide, and sugar alcohol, alone, sufficient fluidity was not obtained and the concrete composition was not yet hardened after 24 hours.

On the other hand, in the case of Examples 24 to 47 using the cement admixtures of the present invention containing at least one compound (C2) selected from oxycarboxylic acid, its salt, saccharide, and sugar alcohol, it was found that, at the test temperature atmosphere of 15° C., although the setting was slow, the spreading speed was high and decrease of the fluidity of concrete compositions was remarkably slight. At the test temperature atmosphere of 30° C., the spreading speed was high and decrease of the fluidity of concrete compositions with the lapse of time was remarkably slight, and further the setting was fast.

EXAMPLES 48 TO 71 AND COMPARATIVE EXAMPLES 21 TO 33

The following compounds were used as a sulfonic acid type dispersant (C3) containing a sulfonic acid group in the molecule or an oxycarboxylic acid compound (D).
(C3-1) Naphthalenesulfonic acid-formaldehyde condensates: Mighty 150 (product of Kao Corp.)
(C3-2) Ligninsulfonic acid salt: Pozzolith No. 8 (product of Pozzolith Bussan Corp.)
(D-1) sodium gluconate Concrete compositions (Formulation A and B) were prepared as the follow, using three types (X, Y, Z) differing in lot Number of Ordinary Portland cement (product of Taiheiyo Cement) as cement, Ohigawa river sand as fine aggregate, Oume crushed stone as coarse aggregate, and tap water as mixing water. In addition, in order to make the temperature of the concrete composition to test temperature, 30° C., the temperature of raw materials, the revolving-puddle mixer and the measurement equipments used for the test were controlled under the test temperature atmosphere, and mixing and each measurement were performed at the test temperature atmosphere. For avoiding the possible influence of bubbles in the concrete composition on the fluidity of the concrete composition, the air content was adjusted to 5.5±0.5% by volume using AE agent ("Binsol W" (trademark, resin soap type, product of Yamaso Chemical Co., Ltd)) and oxyalkylene antifoaming agent ("Surfynol 440" (trademark, acetylene ether derived from acetylene alcohol by addition polymerization of alkylene oxide, product of Nissin Chemical Kogyo Co., Ltd.).
(Formulation A) The cement: 320 kg/m$^3$,
water: 176 kg/m$^3$,
the fine aggregate: 822 kg/m$^3$,
the coarse aggregate: 892 kg/m$^3$,
the proportion of the fine aggregate (the fine aggregate/(the fine aggregate+the coarse aggregate)) (by volume): 48%,
the ratio of water/cement (by mass)=0.55.
(Formulation B) [poor mixtures] The cement: 270 kg/m$^3$,
water: 165 kg/m$^3$,
the fine aggregate: 823 kg/m$^3$,
the coarse aggregate: 1011 kg/m$^3$,
the proportion of the fine aggregate (the fine aggregate/(the fine aggregate+the coarse aggregate)) (by volume): 45%,
the ratio of water/cement (by mass)=0.611.

The concrete was produced by 3 minutes mixing using the revolving-puddle mixer under above-mentioned condition, and Change of the slump value by time, Bleeding ratio, and Air content of the concrete were measured.

The solid content [nonvolatile component] in each cement admixture obtained by above-mentioned Production Examples and the sulfonic acid type dispersant (C3) and the oxycarboxylic acid compounds (D) was measured by weighing an appropriate amount of each aqueous solution, and drying by heating at 130° C. to remove the volatile matter, and an amount of the aqueous cement admixture solution was weighed and incorporated in cement so that a predetermined amount of the solid content [nonvolatile component] might be contained in the formulation.

The amount of each copolymer (A) (or comparative copolymer (A')) in cement admixture relative to the cement (% by mass), the amount of each unsaturated polyalkylene glycol ether monomer (a) relative to the cement (% by mass), non-polymerizable polyalkylene glycol (B) having no alkenyl group relative to the cement (% by mass), the amount of each sulfonic acid type dispersant (C3) containing a sulfonic acid group in the molecule relative to the cement (% by mass), the amount of each oxycarboxylic acid compound (D) relative to the cement (% by mass), the total amount as cement admixture relative to the cement (% by mass), and the amount of each sulfonic acid type dispersant (C3) containing a sulfonic acid group in the molecule or oxycarboxylic acid compound (D) relative to the copolymer (A) (or comparative copolymer (A')) (% by mass) are shown in Table 6 and 7.

Items of the evaluation test and measuring methods thereof are as follows. Results using Formulation A are shown in Table 6, results using Formulation B are shown in Table 7, respectively.

1) Slump value: Measured according to JIS-A-1101

With respect to the fluctuation of the dispersing ability depending on the lot Number of cement, the addition amount of the solid matter of a cement admixture needed to obtain a slump value in a range of 18.0 to 19.0 cm after 5 minutes from starting the mixing in the case of using the cement X was employed also for the cement Y and the cement Z to compare the respective slump values. The smaller the difference (the fluctuation) of the slump value of each cement was, the better the dispersing ability was provided regardless of the lot Number of the cement.

2) Dispersion retaining ratio: According to JIS-A-1101, it was measured by measuring the change of the slump value with the lapse of time in the case of using the cement X and comparing the ratio (%) of the slump value after 60 minutes from the start of mixing with that after 5 minutes from the start of mixing. The higher the numerical value of the dispersing capability retention ratio (%) was, themore excellent dispersion retaining ability was.

3) Bleeding ratio: According to JIS-A-1123, the bleeding ratio was measured in the case of using the cement X. The smaller the numerical value of the bleeding ratio (%) was, the more scarcely bleeding took place and the more excellent the workability was.

TABLE 6

| | Cement admixture | | | Amount of copolymer (A) or (A') (% by mass)/ cement | Amount of monomer (a) (% by mass)/ cement | Amount of polyalkylene glycol (B) (% by mass)/ cement | Amount of sulfonic acid dispersant (C3) (% by mass)/ cement | Amount of sulfonic acid dispersant (C3) (% by mass)/ copolymer (A) or (A') |
|---|---|---|---|---|---|---|---|---|
| | Addreviation | Sulfonic acid dispersant (C3) | Oxycarboxylic acid compound (D) | | | | | |
| Example 48 | Cement admixture (A-1) | C3-1 | — | 0.1039 | 0.0110 | 0.0051 | 0.080 | 77.0 |
| Example 49 | Cement admixture (A-1) | C3-1 | D-1 | 0.1039 | 0.0110 | 0.0051 | 0.080 | 77.0 |

TABLE 6-continued

| | | | | | | | | |
|---|---|---|---|---|---|---|---|---|
| Example 50 | Cement admixture (A-2) | C3-1 | — | 0.1001 | 0.0143 | 0.0056 | 0.080 | 79.9 |
| Example 51 | Cement admixture (A-3) | C3-1 | — | 0.1002 | 0.0224 | 0.0074 | 0.080 | 79.8 |
| Example 52 | Cement admixture (A-4) | C3-1 | — | 0.1099 | 0.0423 | 0.0178 | 0.080 | 72.8 |
| Example 53 | Cement admixture (A-5) | C3-1 | — | 0.1016 | 0.0316 | 0.0088 | 0.080 | 78.8 |
| Example 54 | Cement admixture (A-6) | C3-1 | D-1 | 0.1067 | 0.0084 | 0.0049 | 0.080 | 75.0 |
| Example 55 | Cement admixture (A-7) | C3-1 | — | 0.1053 | 0.0097 | 0.0050 | 0.080 | 75.9 |
| Example 56 | Cement admixture (A-8) | C3-1 | — | 0.1129 | 0.0533 | 0.0038 | 0.080 | 70.8 |
| Example 57 | Cement admixture (A-9) | C3-1 | — | 0.1042 | 0.0608 | 0.0050 | 0.080 | 76.8 |
| Example 58 | Cement admixture (A-10) | C3-1 | D-1 | 0.1132 | 0.0434 | 0.0034 | 0.080 | 70.7 |
| Example 59 | Cement admixture (A-11) | C3-1 | — | 0.1106 | 0.0459 | 0.0035 | 0.080 | 72.3 |
| Comparative Ex. 21 | Comparative cement admixture (A'-1) | C3-1 | — | 0.1391 | 0.0009 | 0.0000 | 0.080 | 57.5 |
| Comparative Ex. 22 | Comparative cement admixture (A'-2) | C3-1 | — | 0.1481 | 0.1719 | 0.0000 | 0.080 | 54.0 |
| Comparative Ex. 23 | Modified product of comparative cement admixture (A'-2) | C3-1 | — | 0.1468 | 0.1704 | 0.1028 | 0.080 | 54.5 |
| Comparative Ex. 24 | Comparative cement admixture (A'-5) | C3-1 | — | 0.1055 | 0.0502 | 0.0044 | 0.080 | 43.1 |
| Comparative Ex. 25 | Cement admixture (A-10) | — | — | 0.1486 | 0.0569 | 0.0045 | 0.000 | 0.0 |
| Comparative Ex. 26 | — | C3-1 | — | 0.0000 | 0.0000 | 0.0000 | 0.400 | — |
| Comparative Ex. 27 | — | C3-2 | — | 0.0000 | 0.0000 | 0.0000 | 0.550 | — |

| | Amount of oxycarboxylic acid compound(D) (% by mass)/ cement | Amount of oxycarboxylic acid compound(D) (% by mass)/ copolymer (A) or (A') | Total amount (% by mass) as cement admixture/ cement | Slump value (cm) | | | Cement X | |
|---|---|---|---|---|---|---|---|---|
| | | | | Cement X | Cement Y | Cement Z | Dispersing retention ratio (%) | Bleeding ratio (%) |
| Example 48 | 0.000 | 0.0 | 0.200 | 18.3 | 17.8 | 19.2 | 78 | 3.7 |
| Example 49 | 0.030 | 28.9 | 0.230 | 18.8 | 18.0 | 19.6 | 90 | 3.9 |
| Example 50 | 0.000 | 0.0 | 0.200 | 18.4 | 17.6 | 19.3 | 80 | 3.5 |
| Example 51 | 0.000 | 0.0 | 0.210 | 18.6 | 17.7 | 19.4 | 82 | 3.0 |
| Example 52 | 0.000 | 0.0 | 0.250 | 18.5 | 17.6 | 19.2 | 87 | 3.3 |
| Example 53 | 0.000 | 0.0 | 0.220 | 18.1 | 17.7 | 18.7 | 85 | 3.4 |
| Example 54 | 0.030 | 28.1 | 0.230 | 18.9 | 18.0 | 19.7 | 88 | 3.8 |
| Example 55 | 0.000 | 0.0 | 0.200 | 18.2 | 17.5 | 19.0 | 82 | 3.6 |
| Example 56 | 0.000 | 0.0 | 0.250 | 18.3 | 17.4 | 19.2 | 75 | 3.8 |
| Example 57 | 0.000 | 0.0 | 0.250 | 18.2 | 17.5 | 19.0 | 78 | 3.6 |
| Example 58 | 0.030 | 26.5 | 0.270 | 18.7 | 18.0 | 19.5 | 86 | 4.0 |
| Example 59 | 0.000 | 0.0 | 0.240 | 18.1 | 17.5 | 18.9 | 81 | 3.7 |
| Comparative Ex. 21 | 0.000 | 0.0 | 0.220 | 18.8 | 17.9 | 19.8 | 42 | 5.2 |
| Comparative Ex. 22 | 0.000 | 0.0 | 0.400 | 18.6 | 17.7 | 19.5 | 48 | 5.7 |
| Comparative Ex. 23 | 0.000 | 0.0 | 0.500 | 18.0 | 17.2 | 18.9 | 63 | 6.0 |
| Comparative Ex. 24 | 0.000 | 0.0 | 0.240 | 18.6 | 17.8 | 19.2 | 53 | 5.6 |
| Comparative Ex. 25 | 0.000 | 0.0 | 0.210 | 18.8 | 17.1 | 20.7 | 71 | 6.7 |
| Comparative Ex. 26 | 0.000 | — | 0.400 | 18.8 | 18.5 | 19.0 | 30 | 6.0 |
| Comparative Ex. 27 | 0.000 | — | 0.550 | 18.7 | 18.5 | 18.9 | 23 | 5.8 |

TABLE 7

| | Addreviation | Cement admixture Sulfonic acid dispersant (C3) | Oxycarboxylic acid compound (D) | Amount of copolymer (A) or (A') (% by mass)/ cement | Amount of monomer (a) (% by mass)/ cement | Amount of polyalkylene glycol (B) (% by mass)/ cement | Amount of sulfonic acid dispersant (C3) (% by mass)/ cement | Amount of sulfonic acid dispersant (C3) (% by mass)/ copolymer (A) or (A') |
|---|---|---|---|---|---|---|---|---|
| Example 60 | Cement admixture (A-1) | C3-2 | — | 0.1039 | 0.0110 | 0.0051 | 0.110 | 105.9 |
| Example 61 | Cement admixture (A-1) | C3-2 | D-1 | 0.1039 | 0.0110 | 0.0051 | 0.110 | 105.9 |
| Example 62 | Cement admixture (A-2) | C3-2 | — | 0.1001 | 0.0143 | 0.0056 | 0.110 | 109.9 |
| Example 63 | Cement admixture (A-3) | C3-2 | — | 0.1002 | 0.0224 | 0.0074 | 0.110 | 109.8 |
| Example 64 | Cement admixture (A-4) | C3-2 | — | 0.1099 | 0.0423 | 0.0178 | 0.110 | 100.1 |
| Example 65 | Cement admixture (A-5) | C3-2 | — | 0.1016 | 0.0316 | 0.0068 | 0.110 | 108.3 |
| Example 66 | Cement admixture (A-6) | C3-2 | D-1 | 0.1067 | 0.0084 | 0.0049 | 0.110 | 103.1 |
| Example 67 | Cement admixture (A-7) | C3-2 | — | 0.1053 | 0.0097 | 0.0050 | 0.110 | 104.4 |
| Example 68 | Cement admixture (A-8) | C3-2 | — | 0.1129 | 0.0533 | 0.0038 | 0.110 | 97.4 |
| Example 69 | Cement admixture (A-9) | C3-2 | — | 0.1042 | 0.0608 | 0.0050 | 0.110 | 105.6 |
| Example 70 | Cement admixture (A-10) | C3-2 | D-1 | 0.1132 | 0.0434 | 0.0034 | 0.110 | 97.2 |
| Example 71 | Cement admixture (A-11) | C3-2 | — | 0.1106 | 0.0459 | 0.0035 | 0.110 | 99.4 |
| Comparative Ex. 28 | Comparative cement admixture (A'-1) | C3-2 | — | 0.1391 | 0.0009 | 0.0000 | 0.110 | 79.1 |
| Comparative Ex. 29 | Comparative cement admixture (A'-2) | C3-2 | — | 0.1481 | 0.1719 | 0.0000 | 0.110 | 74.3 |
| Comparative Ex. 30 | Modified product of comparative cement admixture (A'-2) | C3-2 | — | 0.1468 | 0.1704 | 0.1028 | 0.110 | 74.9 |
| Comparative Ex. 31 | Cement admixture (A-10) | — | — | 0.1557 | 0.0596 | 0.0047 | 0.000 | 0.0 |
| Comparative Ex. 32 | — | C3-1 | — | 0.0000 | 0.0000 | 0.0000 | 0.440 | — |
| Comparative Ex. 33 | — | C3-2 | — | 0.0000 | 0.0000 | 0.0000 | 0.600 | — |

| | Amount of oxycarboxylic acid compound (D) (% by mass)/ cement | Amount of oxycarboxylic acid compound (D) (% by mass)/ copolymer (A) or (A') | Total amount (% by mass) as cement admixture/ cement | Slump value (cm) Cement X | Slump value (cm) Cement Y | Slump value (cm) Cement Z | Cement X Dispersing retention ratio (%) | Cement X Bleeding ratio (%) |
|---|---|---|---|---|---|---|---|---|
| Example 60 | 0.000 | 0.0 | 0.230 | 18.5 | 17.8 | 19.3 | 75 | 4.2 |
| Example 61 | 0.030 | 28.9 | 0.260 | 18.6 | 17.9 | 19.4 | 86 | 4.4 |
| Example 62 | 0.000 | 0.0 | 0.230 | 18.2 | 17.5 | 19.0 | 72 | 3.9 |
| Example 63 | 0.000 | 0.0 | 0.240 | 18.7 | 18.0 | 19.3 | 74 | 3.5 |
| Example 64 | 0.000 | 0.0 | 0.280 | 18.4 | 17.6 | 19.1 | 80 | 3.8 |
| Example 65 | 0.000 | 0.0 | 0.250 | 18.0 | 17.6 | 18.7 | 77 | 3.7 |
| Example 66 | 0.030 | 28.1 | 0.260 | 18.8 | 18.0 | 19.5 | 82 | 4.3 |
| Example 67 | 0.000 | 0.0 | 0.230 | 18.3 | 17.6 | 19.1 | 73 | 4.2 |
| Example 68 | 0.000 | 0.0 | 0.280 | 18.4 | 17.7 | 19.0 | 70 | 4.2 |
| Example 69 | 0.000 | 0.0 | 0.280 | 18.4 | 17.8 | 19.1 | 72 | 3.8 |
| Example 70 | 0.030 | 26.5 | 0.300 | 18.8 | 18.2 | 19.3 | 78 | 4.3 |
| Example 71 | 0.000 | 0.0 | 0.270 | 18.2 | 17.7 | 18.7 | 71 | 4.0 |
| Comparative Ex. 28 | 0.000 | 0.0 | 0.250 | 18.8 | 17.9 | 19.8 | 38 | 5.5 |
| Comparative Ex. 29 | 0.000 | 0.0 | 0.430 | 18.6 | 17.7 | 19.5 | 42 | 6.0 |
| Comparative Ex. 30 | 0.000 | 0.0 | 0.530 | 18.0 | 17.2 | 18.9 | 56 | 6.2 |
| Comparative Ex. 31 | 0.000 | 0.0 | 0.220 | 18.6 | 17.0 | 20.3 | 68 | 7.2 |
| Comparative Ex. 32 | 0.000 | — | 0.440 | 18.5 | 18.2 | 18.8 | 27 | 6.6 |
| Comparative Ex. 33 | 0.000 | — | 0.600 | 18.4 | 18.1 | 18.6 | 18 | 6.3 |

From the results shown in Table 6, with respect to the formulation A, in any case of using Comparative Example 21 using Comparative cement admixture (A'-1) (the content of the unsaturated polyalkylene glycol ether monomer (a) was too small and no polyalkylene glycol (B) was added), Comparative Example 22 using Comparative cement admixture (A'-2) (the content of the unsaturated polyalkylene glycol ether monomer (a) was too high and no polyalkylene glycol (B) was added), Comparative Example 23 using Modified product of the comparative cement admixture (A'-2) (the contents of both of the unsaturated polyalkylene glycol ether monomer (a) and the polyalkylene glycol (B) were too high), and Comparative Example 24 using Comparative cement admixture (A'-5), which is equivalent to Polymer (A-11) according to Production Example 29 of WO02/096823, it was found that the dispersion retaining ratio was low and the bleeding ratio was high. In addition, in the case of Comparative Example 25 using Cement admixture (A-10) without using the sulfonic acid type dispersant (C3-1) in combination, it was found that although the dispersion retaining ratio was high, both of the fluctuation of the slump value depending on the lot Number of the cement and the bleeding ratio were high. Meanwhile, in the case of Comparative Examples 26 and 27 respectively using the sulfonic acid type dispersants (C3-1) and (C3-2) alone, it was found that although the fluctuation of the slump value depending on the lot Number of the cement was slight, the dispersion retaining ratio was considerably low and the bleeding ratio was high.

On the other hand, in the case of Examples 48 to 59 using Cement admixtures of the present invention containing the sulfonic acid type dispersant (C3-1), it was found that the fluctuation of the slump value depending on the lot Number of the cement was slight, the dispersion retaining ratio was high, and the bleeding ratio was low.

From the results shown in Table 7, with respect to the formulation B (poor mixtures), in any case of using Comparative Example 28 using Comparative cement admixture (A'-1) (the content of the unsaturated polyalkylene glycol ether monomer (a) was too small and no polyalkylene glycol (B) was added), Comparative Example 29 using the Comparative cement admixture (A'-2) (the content of the unsaturated polyalkylene glycol ether monomer (a) was too high and no polyalkylene glycol (B) was added), and Comparative Example 30 using Modified product of the comparative cement admixture (A'-2) (the contents of both of the unsaturated polyalkylene glycol ether monomer (a) and the polyalkylene glycol (B) were too high), it was found that the dispersion retaining ratio was low and the bleeding ratio was high. In addition, in the case of Comparative Example 31 using Cement admixture (A-10) without using the sulfonic acid type dispersant (C3-2) in combination, it was found that although the dispersion retaining ratio was high, both of the fluctuation of the slump value depending on the lot Number of the cement and the bleeding ratio were high. Meanwhile, in the case of Comparative Examples 32 and 33 respectively using the sulfonic acid type dispersants (C3-1) and (C3-2) alone, it was found that although the fluctuation of the slump value depending on the lot Number of the cement was slight, the dispersion retaining ratio was considerably low and the bleeding ratio was high.

On the other hand, in the case of Examples 60 to 71 using Cement admixtures of the present invention containing the sulfonic acid type dispersant (C3-2), it was found that the fluctuation of the slump value depending on the lot Number of the cement was slight, the dispersion retaining ratio was high, and the bleeding ratio was low.

The present application claims priority under 35 U.S.C. §119 to Japanese Patent Application No. 2003-058191, filed Mar. 5, 2003, entitled "CEMENT ADMIXTURE AND PRODUCING METHOD OF CEMENT HARDENED PRODUCT", Japanese Patent Application No. 2003-058369, filed Mar. 5, 2003, entitled "CEMENT ADMIXTURE AND METHOD FOR LAYING WORK OF CEMENT COMPOSITION", and Japanese Patent Application No.2003-087753, filed Mar. 27, 2003, entitled "CEMENT ADMIXTURE AND CEMENT COMPOSITION". The content of this application is incorporated herein by reference in its entirety.

The invention claimed is:

1. An admixture for cement comprising three components of a copolymer (A), an unsaturated (poly)alkylene glycol ether monomer (a) and a non-polymerizable (poly)alkylene glycol (B) having no alkenyl group at ratios of the unsaturated (poly)alkylene glycol ether monomer (a) to the copolymer (A) in a range of 1 to 100% by mass and the non-polymerizable (poly)alkylene glycol (B) having no alkenyl group to the copolymer (A) in a range of 1 to 50% by mass, wherein the copolymer (A) contains a constituent unit (I) derived from the unsaturated (poly)alkylene glycol ether monomer (a) and a constituent unit (II) derived from a maleic acid monomer (b) at ratios of the constituent unit (I) and the constituent unit (II) in a range of 1% by mass or more, respectively, in the entire constituent units, and the unsaturated (poly)alkylene glycol ether monomer (a) is represented by the general formula (1):

wherein Y represents an alkenyl group containing 2 to 4 carbon atoms, $R^2$ represents a hydrogen atom or a hydrocarbon group containing 1 to 30 carbon atoms, $R^1O$ represents one or more species of oxyalkylene groups containing 2 to 18 carbon atoms, and n represents the average molar number of addition of the oxyalkylene groups and is a number of 1 to 500.

2. An admixture for cement according to claim 1, wherein the maleic acid monomer (b) is represented by the general formula (2):

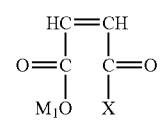

wherein X represents $-OM_2$ or $-Z-(R^3O)_qR^4$, $M_1$ and $M_2$ may be the same or different and each represents a hydrogen atom, a monovalent metal, a divalent metal, an ammonium group or an organic ammonium group, -Z- represents $-O-$ or $-NH-$, $R^3O$ represents one or more species of oxyalkylene groups containing 2 to 18 carbon atoms, $R^4$ represents a hydrogen atom, an alkyl group containing 1 to 30 carbon atoms, a phenyl group, an aminoalkyl group, an alkylphenyl group or a hydroxyalkyl group (the number of carbon atoms of the alkyl groups in the aminoalkyl group, the alkylphenyl group and the hydroxyalkyl group is 1 to 30), q represents the average molar number of addition of the oxyalkylene groups and is a number of 0 to 500, provided that the compound includes those having acid anhydride group ($-CO-O-CO-$) formed by bond of oxygen bonded to M1 with carbon bonded to X, in which M1 and X do not exist.

3. An admixture for cement according to claim 1, wherein the oxyalkylene group composing the non-polymerizable (poly)alkylene glycol (B) having no alkenyl group is one or more species of oxyalkylene groups containing 2 to 18 carbon atoms, and the terminal group of the non-polymerizable (poly)alkylene glycol (B)

having no alkenyl group is a hydrogen atom, an alkyl group or an (alkyl)phenyl group containing 1 to 30 carbon atoms.

4. An admixture for cement according to claim 2,
wherein the oxyalkylene group composing the non-polymerizable (poly)alkylene glycol (B) having no alkenyl group is one or more species of oxyalkylene groups containing 2 to 18 carbon atoms, and the terminal group of the non-polymerizable (poly)alkylene glycol (B) having no alkenyl group is a hydrogen atom, an alkyl group or an (alkyl)phenyl group containing 1 to 30 carbon atoms.

5. A cement composition comprising the admixture for cement according to claim 1, cement and water.

6. A cement composition comprising the admixture for cement according to claim 2, cement and water.

7. A method for producing a cement hardened product, comprising:
applying a cement composition comprising the admixture for cement according to claim 1 containing a setting accelerator (C1), cement and water; and
hardening the cement composition at a temperature condition of 30° C. or less.

8. A method for producing a cement hardened product, comprising:
applying a cement composition comprising the admixture for cement according to claim 2 containing a setting accelerator (C1), cement and water; and
hardening the cement composition at a temperature condition of 30° C. or less.

9. A method for applying a cement composition comprising:
applying the cement composition comprising the admixture for cement according to claim 1 containing at least one compound (C2) selected from the group consisting of oxycarboxylic acid, its salt, saccharide, and sugar alcohol, cement and water at a temperature condition of 20° C. or more.

10. A method for applying a cement composition comprising:
applying the cement composition comprising the admixture for cement according to claim 2 containing at least one compound (C2) selected from the group consisting of oxycarboxylic acid, its salt, saccharide, and sugar alcohol, cement and water at a temperature condition of 20° C. or more.

11. An admixture for cement according to claim 1,
wherein the oxyalkylene group composing the non-polymerizable (poly)alkylene glycol (B) having no alkenyl group is one or more species of oxyalkylene groups containing 2 to 18 carbon atoms, and the oxyalkylene group comprises an oxyethylene group accounting for at least 50 mole percent, and
the terminal group of the non-polymerizable (poly)alkylene glycol (B) having no alkenyl group is a hydrogen atom or an alkyl group containing 1 to 4 carbon atoms.

12. An admixture for cement according to claim 2,
wherein the oxyalkylene group composing the non-polymerizable (poly)alkylene glycol (B) having no alkenyl group is one or more species of oxyalkylene groups containing 2 to 18 carbon atoms, and the oxyalkylene group comprises an oxyethylene group accounting for at least 50 mole percent, and
the terminal group of the non-polymerizable (poly)alkylene glycol (B) having no alkenyl group is a hydrogen atom or an alkyl group containing 1 to 4 carbon atoms.

13. An admixture for cement according to claim 11,
wherein the oxyalkylene group composing the non-polymerizable (poly)alkylene glycol (B) having no alkenyl group comprises an oxyethylene group accounting for at least 90 mole percent, and
the terminal group of the non-polymerizable (poly)alkylene glycol (B) having no alkenyl group is a hydrogen atom.

14. An admixture for cement according to claim 12,
wherein the oxyalkylene group composing the non-polymerizable (poly)alkylene glycol (B) having no alkenyl group comprises an oxyethylene group accounting for at least 90 mole percent, and
the terminal group of the non-polymerizable (poly)alkylene glycol (B) having no alkenyl group is a hydrogen atom.

15. An admixture for cement according to claim 1,
wherein $R^2$ in the formula (1) is a hydrogen atom.

16. An admixture for cement according to claim 2,
wherein $R^2$ in the formula (1) is a hydrogen atom.

17. An admixture for cement according to claim 1,
further comprising at least one additive selected from the group consisting of (C1) a setting accelerator, (C2) at least one compound selected from oxycarboxylic acid, its salt, saccharide, and sugar alcohol, and (C3) a sulfonic acid dispersant containing a sulfonic acid group in the molecule.

18. An admixture for cement according to claim 2,
further comprising at least one additive selected from the group consisting of (C1) a setting accelerator, (C2) at least one compound selected from oxycarboxylic acid, its salt, saccharide, and sugar alcohol, and (C3) a sulfonic acid dispersant containing a sulfonic acid group in the molecule.

19. An admixture for cement according to claim 3,
further comprising at least one additive selected from the group consisting of (C1) a setting accelerator, (C2) at least one compound selected from oxycarboxylic acid, its salt, saccharide, and sugar alcohol, and (C3) a sulfonic acid dispersant containing a sulfonic acid group in the molecule.

20. An admixture for cement according to claim 4,
further comprising at least one additive selected from the group consisting of (C1) a setting accelerator, (C2) at least one compound selected from oxycarboxylic acid, its salt, saccharide, and sugar alcohol, and (C3) a sulfonic acid dispersant containing a sulfonic acid group in the molecule.

21. An admixture for cement according to claim 17,
wherein the sulfonic acid dispersant (C3) containing a sulfonic acid group in the molecule is a compound having an aromatic group.

22. An admixture for cement according to claim 18,
wherein the sulfonic acid dispersant (C3) containing a sulfonic acid group in the molecule is a compound having an aromatic group.

23. An admixture for cement according to claim 19,
wherein the sulfonic acid dispersant (C3) containing a sulfonic acid group in the molecule is a compound having an aromatic group.

24. An admixture for cement according to claim 20,
wherein the sulfonic acid dispersant (C3) containing a sulfonic acid group in the molecule is a compound having an aromatic group.

25. An admixture for cement according to claim 11,
further comprising at least one additive selected from the group consisting of (C1) a setting accelerator, (C2) at least one compound selected from oxycarboxylic acid, its salt, saccharide, and sugar alcohol, and (C3) a sulfonic acid dispersant containing a sulfonic acid group in the molecule.

26. An admixture for cement according to claim 12,
further comprising at least one additive selected from the group consisting of (C1) a setting accelerator, (C2) at least one compound selected from oxycarboxylic acid, its salt, saccharide, and sugar alcohol, and (C3) a sulfonic acid dispersant containing a sulfonic acid group in the molecule.

27. An admixture for cement according to claim 25,
wherein the sulfonic acid dispersant (C3) containing a sulfonic acid group in the molecule is a compound having an aromatic group.

28. An admixture for cement according to claim 26,
wherein the sulfonic acid dispersant (C3) containing a sulfonic acid group in the molecule is a compound having an aromatic group.

29. The cement admixture according to claim 1, wherein the content of the unsaturated (poly)alkylene glycol ether monomer (a) is 3 to 90% by mass relative to 100% by mass of the copolymer (A), and the content of the non-polymerizable (poly)alkylene glycol (B) having no alkenyl group is 2 to 50% by mass relative to 100% by mass of the copolymer (A).

30. The cement admixture according to claim 11, wherein the content of the unsaturated (poly)alkylene glycol ether monomer (a) is 3 to 90% by mass relative to 100% by mass of the copolymer (A), and the content of the non-polymerizable (poly)alkylene glycol (B) having no alkenyl group is 2 to 50% by mass relative to 100% by mass of the copolymer (A).

31. The cement admixture according to claim 15, wherein the content of the unsaturated (poly)alkylene glycol ether monomer (a) is 3 to 90% by mass relative to 100% by mass of the copolymer (A), and the content of the non-polymerizable (poly)alkylene glycol (B) having no alkenyl group is 2 to 50% by mass relative to 100% by mass of the copolymer (A).

* * * * *